United States Patent
Wang et al.

(10) Patent No.: US 8,914,187 B2
(45) Date of Patent: Dec. 16, 2014

(54) VEHICLE DASHBOARD WIRELESS DISPLAY SYSTEM

(71) Applicant: QUALCOMM Incorporated, San Diego, CA (US)

(72) Inventors: Xiaodong Wang, San Diego, CA (US); Vijayalakshmi R. Raveendran, San Diego, CA (US); Xiaolong Huang, San Diego, CA (US); Jeff S. Froelicher, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 13/666,121

(22) Filed: Nov. 1, 2012

(65) Prior Publication Data

US 2013/0179029 A1 Jul. 11, 2013

Related U.S. Application Data

(60) Provisional application No. 61/583,798, filed on Jan. 6, 2012.

(51) Int. Cl.
*H04W 4/04* (2009.01)

(52) U.S. Cl.
USPC .......................................... 701/32.7; 370/474

(58) Field of Classification Search
CPC ......... H04L 67/12; H04L 69/22; B60K 37/06
USPC .......................................... 701/32.7; 370/474
See application file for complete search history.

(56) References Cited

U.S. PATENT DOCUMENTS

| 6,622,018 | B1 | 9/2003 | Erekson |
| 8,177,182 | B1 | 5/2012 | Wood et al. |
| 2008/0129879 | A1* | 6/2008 | Shao et al. ..................... 348/723 |
| 2010/0127847 | A1* | 5/2010 | Evans et al. ................... 340/461 |

(Continued)

FOREIGN PATENT DOCUMENTS

WO 2012100191 7/2012

OTHER PUBLICATIONS

Raja Bose et al., "Terminal Mode" Proceedings of the $2^{nd}$ International Conference on International Automotive User Interfaces and Interactive Vehicle Applications, AutomotiveUI '10, Jan. 1, 2010, p. 148, XP055083625, New York, NY, USA DOI: 10.1145/1969773. 1969801 ISBN: 978-1-45-030437-5.*

(Continued)

*Primary Examiner* — Mary Cheung
*Assistant Examiner* — Brian P Sweeney
(74) *Attorney, Agent, or Firm* — Donald C. Kordich

(57) ABSTRACT

A wireless source and an automobile dashboard configured to function as a wireless sink device are configured to communicate with one another including authenticating the source device for communications with the dashboard sink, transmitting user inputs received at the dashboard sink back to the wireless source device to enable a user to control the source device and interact with and control the content that is being transmitted from the source device to the dashboard sink, controlling the operational state of the source device based on the operational state of the automobile in which the dashboard sink is arranged, and transmitting data generated by the automobile from the dashboard sink to the source device so as to enable the source device to process at least some of the data.

59 Claims, 19 Drawing Sheets

(56) References Cited

U.S. PATENT DOCUMENTS

| | | |
|---|---|---|
| 2010/0159846 A1 | 6/2010 | Witkowski et al. |
| 2011/0107388 A1 | 5/2011 | Lee et al. |
| 2012/0100806 A1 | 4/2012 | Hall |
| 2013/0003621 A1 | 1/2013 | Huang et al. |

OTHER PUBLICATIONS

Kennemer, Quentyn, "Control Your Phone Using Your Car," http://phandroid.com/2010/04/20/control-your-phone-using-your-car, Apr. 20, 2010, pp. 1-3.

Eichhorn M., et al., "A SOA-based middleware concept for in-vehicle service discovery and device integration", Intelligent Vehicles Symposium (IV), 2010 IEEE, IEEE, Piscataway, NJ, USA, Jun. 21, 2010, pp. 663-669, XP031732138, ISBN: 978-1-4244-7866-8 abstract, p. 665, left-hand column, paragraph 2-paragraph 3.

Partial International Search Report—PCT/US2013/020150—ISA/EPO—Jul. 12, 2013.

International Search Report and Written Opinion—PCT/US2013/020150—ISA/EPO—Sep. 9, 2013.

* cited by examiner

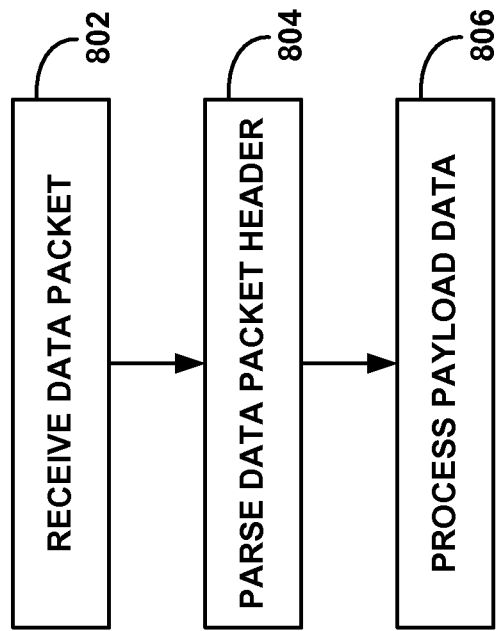
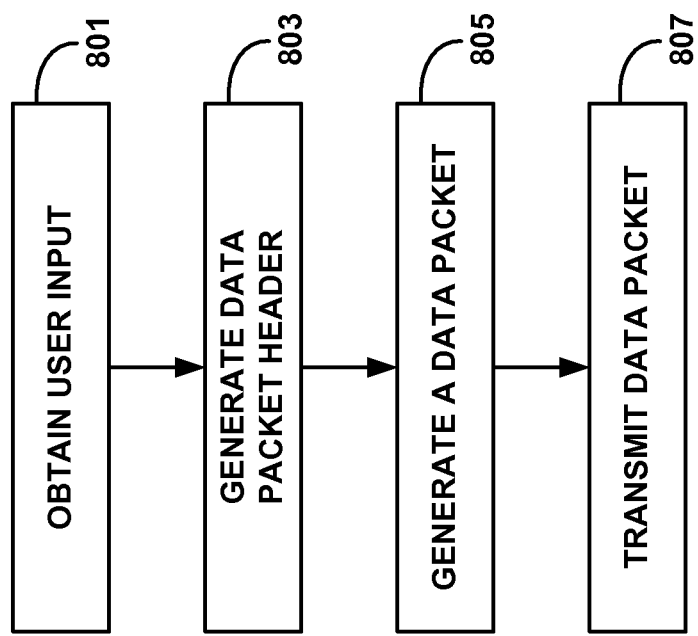
FIG. 8B
FIG. 8A

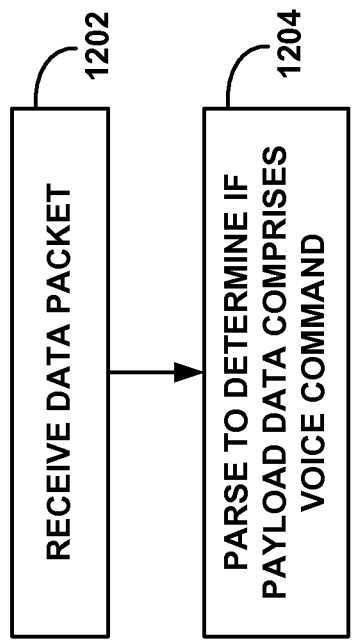
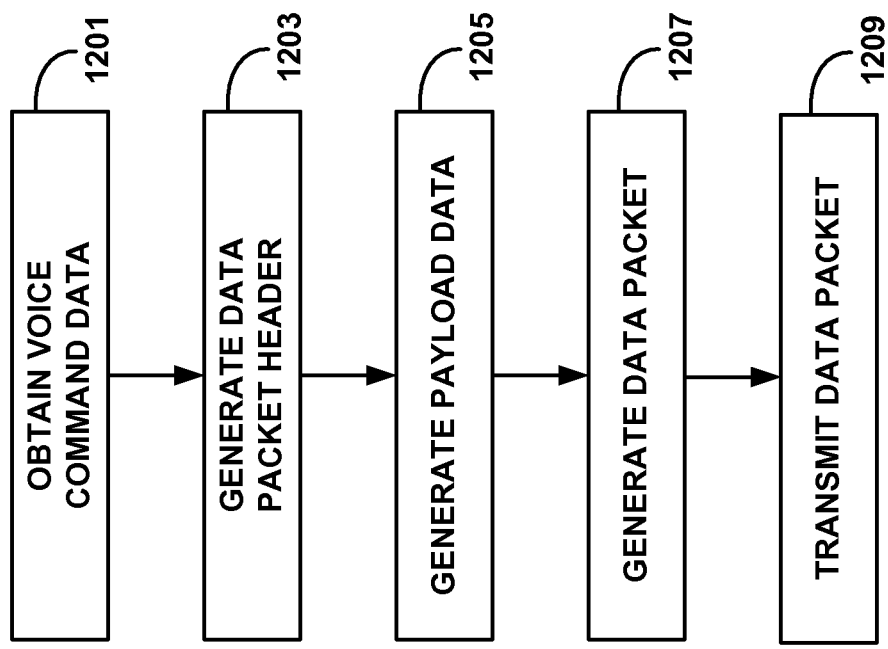
FIG. 12B
FIG. 12A

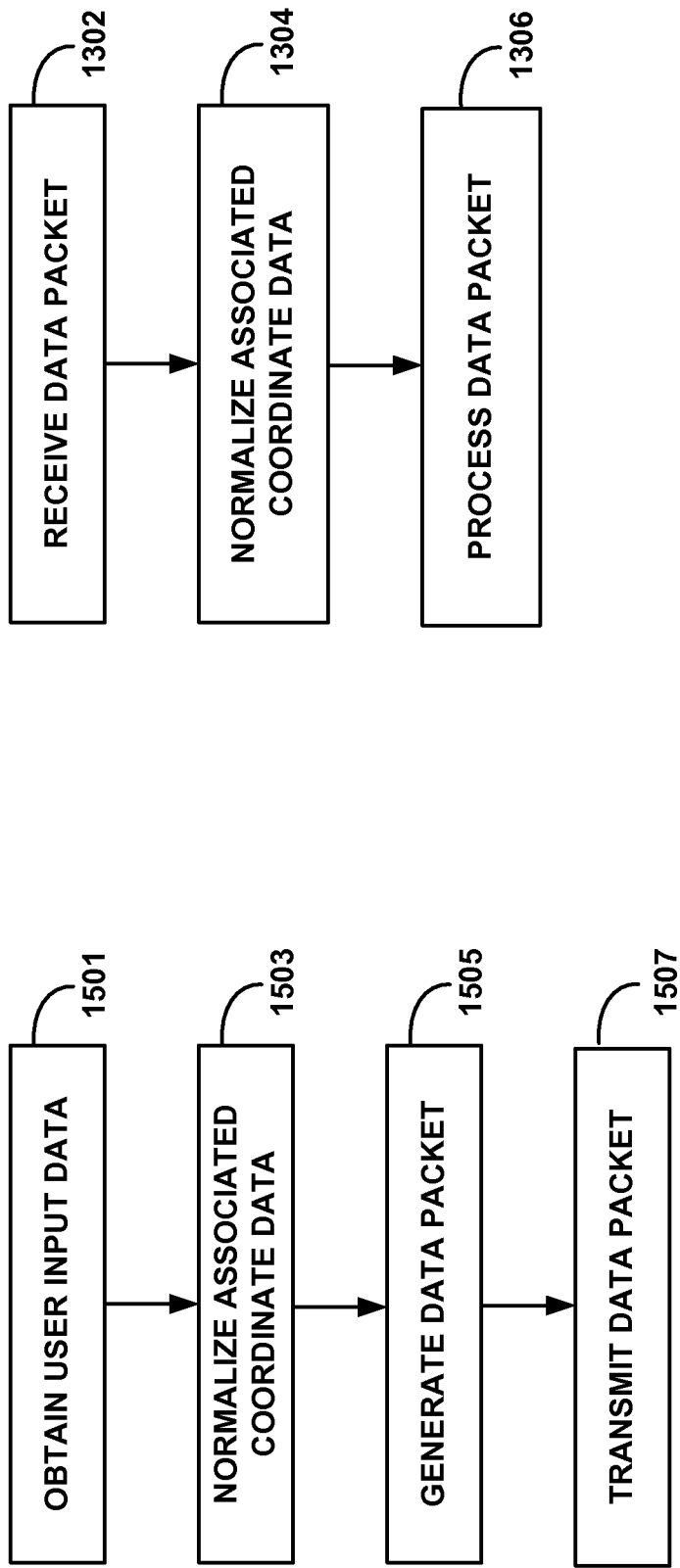

VEHICLE DASHBOARD WIRELESS DISPLAY SYSTEM

This application claims the benefit of U.S. Provisional Application No. 61/583,798, filed Jan. 6, 2012, the entire contents of which are incorporated herein by reference.

TECHNICAL FIELD

This disclosure relates to techniques for transmitting data between a wireless source device and a wireless sink device.

BACKGROUND

Wireless display (WD) or Wi-Fi Display (WFD) systems include a wireless source device and one or more wireless sink devices. The source device and each of the sink devices may be either mobile devices or wired devices with wireless communication capabilities. One or more of the source device and the sink devices may, for example, include mobile telephones, portable computers with wireless communication cards, personal digital assistants (PDAs), portable media players, or other such devices with wireless communication capabilities, including so-called "smart" phones and "smart" pads or tablets, e-readers, or any type of wireless display, video gaming devices, or other types of wireless communication devices. One or more of the source device and the sink devices may also include wired devices such as televisions, desktop computers, monitors, projectors, and the like, that include communication capabilities.

The source device sends media data, such as audio video (AV) data, to one or more of the sink devices participating in a particular media share session. The media data may be played back at both a local display of the source device and at each of the displays of the sink devices. More specifically, each of the participating sink devices renders the received media data on its screen and audio equipment.

SUMMARY

This disclosure generally describes a system where a wireless source device can communicate with a wireless sink device. As part of a communication session, a wireless source device can transmit audio and video data to the wireless sink device, and the wireless sink device can transmit user inputs received at the wireless sink device back to the wireless source device. In this manner, a user of the wireless sink device can control the wireless source device and control the content that is being transmitted from the wireless source device to the wireless sink device. Examples according to this disclosure relate to employing the foregoing techniques and others in cases in which the sink device forms part or the entire dashboard in a vehicle. Vehicles in which a dashboard sink device according to this disclosure can include an automobile, watercraft, aircraft, all-terrain vehicle (ATV), or any other type of vehicle that includes an dashboard including an electronic display device.

In one example, a vehicle dashboard is configured to function as a wireless sink device and to transmit user input data to a wireless source device. The dashboard includes memory storing instructions, a display device configured to obtain user input data, one or more processors configured to execute the instructions, and a transport unit. Upon execution of the instructions the one or more processors cause generating a data packet header, wherein the data packet header comprises a field to identify an input category of the user input data, and generating a data packet comprising the data packet header and payload data. The transport unit is configured to transmit the data packet to the wireless source device.

In another example, a wireless source device is configured to receive user input data from a vehicle dashboard configured to function as a wireless sink device. The wireless source device includes a transport unit, a memory storing instructions, and one or more processors configured to execute the instructions. The transport unit is configured to receive a data packet from the dashboard. The data packet includes a data packet header and payload data. Upon execution of the instructions the one or more processors cause parsing the data packet header to determine an input category associated with user input data contained in the payload data and processing the payload data based on the determined input category.

Another example includes a method of communicating between a vehicle dashboard configured to function as a wireless sink device and a wireless source device. The method includes authenticating the source device to communicate with the dashboard, communicating data indicative of the operational state of an vehicle in which the dashboard is arranged from the dashboard to the source device, setting the operational state of the source device based on the operational state of the vehicle, and communicating at least one of user input data and vehicle data from the dashboard sink to the source device.

BRIEF DESCRIPTION OF DRAWINGS

FIGS. 8A and 8B are flow charts illustrating techniques of this disclosure that may be used for transmitting and receiving data packets with user input data.

FIGS. 12A and 12B are flow charts illustrating techniques of this disclosure that may be used for transmitting and receiving data packets that include voice commands.

FIGS. 15A and 15B are flow charts illustrating techniques of this disclosure that may be used for transmitting and receiving data packets.

DETAILED DESCRIPTION

Figure 1A:
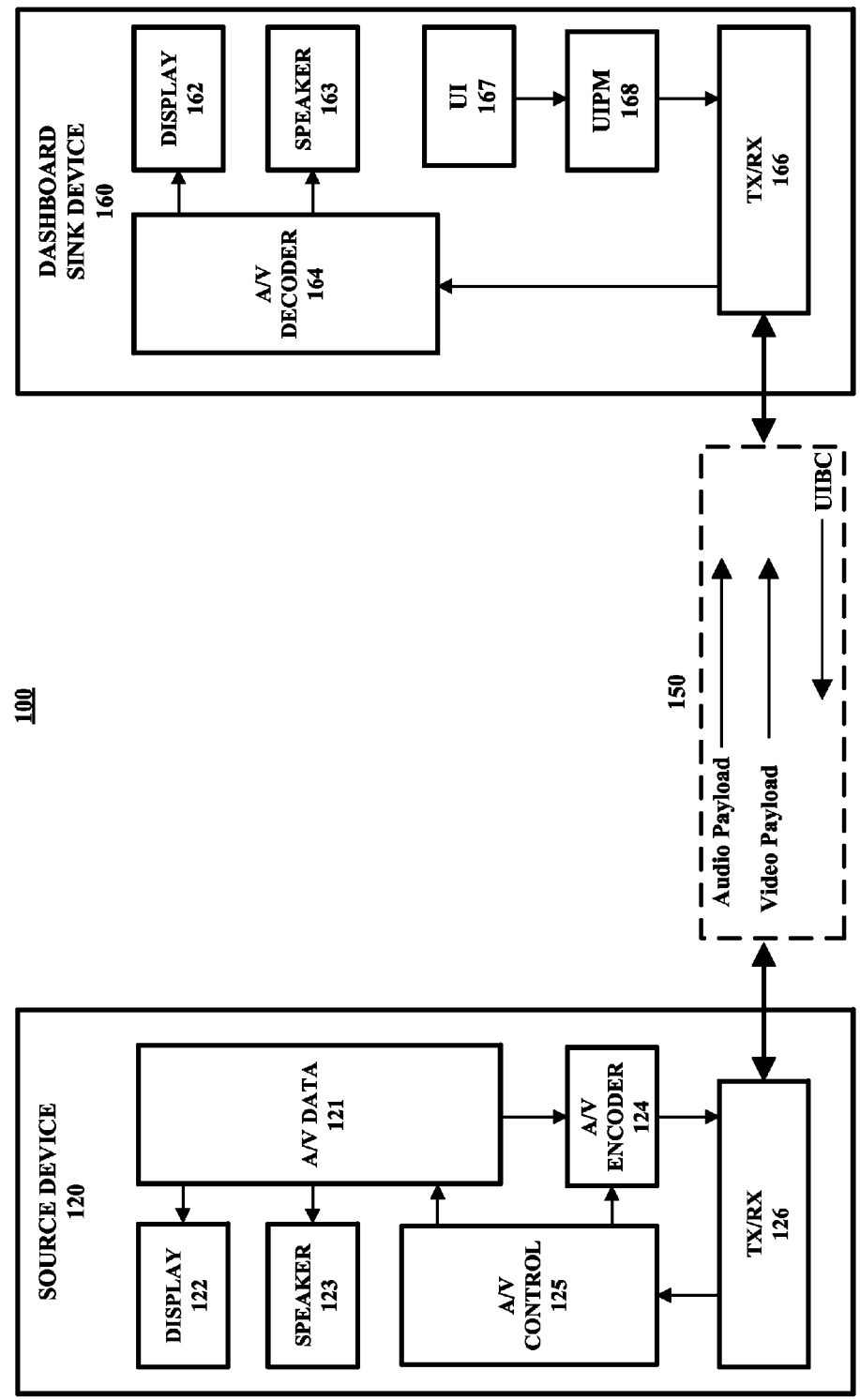
FIG. 1A is a block diagram illustrating an example of a source/sink system that may implement techniques of this disclosure.

This disclosure generally describes a system in which a wireless source device (sometimes referred to herein as simply "source device") can communicate with a wireless sink device (sometimes referred to herein as simply "source device"). As part of a communication session, a source device can transmit audio and video data to the sink device, and the sink device can transmit user inputs received at the sink device back to the source device. In this manner, a user of the wireless sink device can control the wireless source device and control the content that is being transmitted from the source device to the sink device.

The foregoing functionality of communicating between a wireless source and sink device and providing user input at the sink device for content provided by the source device may be employed in a number of different contexts including different types of sink and source devices. Examples according to this disclosure relate to employing such techniques where the sink device forms part of or the entire dashboard in an automobile or other motorized vehicle.

In one example, the core functionality of a wireless sink device includes transmitting user inputs received at the sink device back to a wireless source device and, thus, enabling a user of the sink device to control the source device and interact with and control the content that is being transmitted from the source device to the sink device is applied in a system including an automobile dashboard as the sink device. In such examples, applications and data available on a user device that acts as a source device may be viewed, accessed, and interacted with on the dashboard of an automobile. In one example, mobile phone applications like contacts and calendar applications, navigation applications, digital music players, and the like may be easily and seamlessly presented on and interacted with via the automobile or other vehicle dashboard.

Employing wireless display functionality as described above with reference to systems and methods for communication between a wireless source device and a wireless sink device includes a number of particular challenges when the sink device is the dashboard of a motorized vehicle like, e.g., an automobile. One challenge includes authenticating the source device for communications with the automobile dashboard. Because the dashboard sink device may have access to and/or control over sensitive information related to the operation of the automobile, it may be desirable to require a method of authenticating the source device for communications with the dashboard sink device.

Additionally, the communications between source and dashboard sink may vary widely depending on the manufacturer of the automobile. Thus, different manufacturers may require different functionality of the same type of source device in order to communicate with the dashboard sink included in each respective manufacturer's automobiles.

Thus, rather than employing generic wireless display functions/applications, e.g. functions provided in one or more standards for WFD systems, in the context of a source communicating with an automobile dashboard sink, the source device may include an application that is authenticated by the manufacturer of the automobile or dashboard (to the extent the two are manufactured by different companies) and specifically configured to communicate with the dashboard sink of that manufacturer. The dashboard application can be executed by the source device, e.g., a mobile phone and can include a third-party user application including a user interface by which the user of the source device can initiate, control, and manage communications between the source and a dashboard sink device.

In such examples, authentication between dashboard/automobile manufacturers and third parties, e.g. mobile phone manufacturers and/or mobile phone application developers may be accomplished in a number of different ways. In one example in which a mobile phone acts as a wireless source device and communicates with the dashboard sink device, the dashboard manufacturer may authenticate one or more applications executable on the mobile phone and configured to communicate with the dashboard. The authentication may include multiple levels of security for establishing communication between phone source and dashboard sink devices.

In one example, the authentication includes two levels of security for establishing communication between phone source and dashboard sink devices. First, the source device application developer may seek and the manufacturer may grant authorization of a particular application to coordinate and control communications between a source device executing the application and the dashboard sink device of the manufacturer. For example, a mobile phone application developer that develops applications executable on different operating systems of mobile phones may seek authorization from a particular automobile manufacturer to develop an application for such phones that will enable a phone to function as a wireless source device in communications with a dashboard sink device in an automobile produced by the manufacturer. In such an example, the automobile manufacturer may authenticate the mobile phone application by providing the application developer with a key that may be communicated to the dashboard sink device in order to open communications between the phone source device and the dashboard sink device.

Wireless communications may be unsecure and thus susceptible to various attacks from unauthorized users and/or devices. As such, in addition to providing an authentication key that is used to authenticate a particular mobile phone application for use with a phone source device in communications with a particular dashboard sink device, examples according to this disclosure may also include securing the initial handshake between phone source and dashboard sink that includes the communication of the manufacturer authentication key. In one example, the initial handshake and communication of the authentication key between the phone source device and the dashboard sink device is encrypted, e.g. using an encryption/decryption key scheme by which the mobile phone application encrypts data including the manufacturer authentication key, wireless transmits the encrypted data to the dashboard, which, in turn, decrypts and reads the data from the phone. After the phone has been authenticated for WFD with the dashboard sink device, future communications can be transmitted with or without encryption.

In addition to functions for authenticating the communication session between a wireless source device and an automobile dashboard sink device, the link between source and dashboard sink facilitates a number of functions for communicating, analyzing, storing, manipulating, etc. data and/or devices related to or included in the automobile, e.g. data related to the operation of the automobile or peripheral devices in the automobile like speakers and microphones. In some examples, data from sensors on board the automobile in which the dashboard sink device is arranged may be communicated from the dashboard to the wireless source device. For example, gas mileage data tracked and stored by sensors and the engine control unit (ECU) of the automobile may be communicated from the dashboard sink device to the wireless source device, e.g. to a user's mobile phone. The mobile phone may include various functions for processing the data from the automobile for presentation to and interpretation by the user.

In some examples, the dashboard sink device may open a channel from the source device to peripheral devices, e.g. speakers and/or a microphone in the automobile for direct interaction between the source and the peripherals. For example, an agent executed on the dashboard sink may open a channel from a mobile phone source to provide the mobile phone source access to a higher quality microphone in the automobile than is included in the mobile phone. In one example, a user of the mobile phone source may wish to call someone in a contacts application on the phone while driving in the user's automobile and may use a voice command received at a microphone of the automobile which is accessed via dashboard sink as a safer means of retrieving a contact number and initiating the call.

Another function facilitated by pairing a wireless source device for communications with an automobile dashboard sink is the ability to alter the communications and operations of the source and/or sink devices based on the state of the automobile, e.g. based on whether the automobile is moving or stopped. In one example according to this disclosure, an automobile dashboard sink device paired with a wireless source device, e.g., a mobile phone, may be configured to indicate to the mobile phone source when the state of the automobile changes and alter communications with and control operation of the phone based on the current state of the automobile. For example, the dashboard sink device may be configured to receive information from various components of the automobile, e.g., sensors and/or the ECU, which indicates when the automobile begins to move. In the event the dashboard sink device determines that the automobile is moving, the dashboard may send a command to the phone source that causes the source to go into a limited functionality operation mode. For example, the command from the dashboard sink device may cause the phone to limit access to certain functions that may be dangerous for users to execute while driving a car, e.g. text messaging.

The foregoing functions related to communicating between a wireless source device and a vehicle dashboard configured to function as a wireless sink device are described in more detail below with reference to FIGS. 16 and 17. However, first systems configured for and methods of communicating between a source and sink device including transmitting user inputs received at the wireless sink device back to a wireless source device are more generally described with reference to FIGS. 1A-15.

FIG. 1A is a block diagram illustrating an exemplary source/sink system 100 that may implement one or more of the techniques of this disclosure. As shown in FIG. 1A, system 100 includes source device 120 that communicates with sink device 160 via communication channel 150. Source device 120 may include a memory that stores audio/video (A/V) data 121, display 122, speaker 123, audio/video encoder 124 (also referred to as encoder 124), audio/video control module 125, and transmitter/receiver (TX/RX) unit 126. Additionally, memory of source device 120 may store an application that is authenticated to initiate and manage communications between source device 120 and sink device 160. In examples according to this disclosure, sink device 160 forms part or all of an automobile or other motorized vehicle dashboard and thus is sometimes referred to as dashboard sink device 160 in the following examples. Dashboard sink device 160 may include display 162, speaker 163, audio/video decoder 164 (also referred to as decoder 164), transmitter/receiver unit 166, user input (UI) device 167, and user input processing module 168. The illustrated components constitute merely one example configuration for source/sink system 100. Other configurations may include fewer components than those illustrated or may include additional components than those illustrated.

In one example, as described in more detail below, memory of source device 120 may store an application that is authenticated to initiate and manage communications between source device 120 and automobile dashboard sink device 160 by the manufacturer of the automobile and/or dashboard. The source device application may include a variety of functions including, e.g., mirroring native functions of the dashboard of the automobile on the source device and receiving and processing automobile data received from sink device 160.

In the example of FIG. 1A, source device 120 can display the video portion of audio/video data 121 on display 122 and can output the audio portion of audio/video data 121 on speaker 123. Audio/video data 121 may be stored locally on source device 120, accessed from an external storage medium such as a file server, hard drive, external memory, Blu-ray disc, DVD, or other physical storage medium, or may be streamed to source device 120 via a network connection including, e.g., via the Internet. In some instances audio/video data 121 may be captured in real-time via a camera and microphone of source device 120. Audio/video data 121 may include multimedia content such as movies, television shows, or music, but may also include real-time content generated by source device 120. Such real-time content may for example be produced by applications running on source device 120, or video data captured, e.g., as part of a video telephony session. As will be described in more detail, such real-time content may in some instances include a video frame of user input options available for a user to select. In some instances, audio/video data 121 may include video frames that are a combination of different types of content, such as a video frame of a movie or TV program that has user input options overlaid on the frame of video.

In addition to rendering audio/video data 121 locally via display 122 and speaker 123, audio/video encoder 124 of source device 120 can encode audio/video data 121, and transmitter/receiver unit 126 can transmit the encoded data over communication channel 150 to sink device 160. Transmitter/receiver unit 166 of sink device 160 receives the encoded data, and audio/video decoder 164 decodes the encoded data and outputs the decoded data via display 162 and speaker 163. In this manner, the audio and video data being rendered by display 122 and speaker 123 can be simultaneously rendered by display 162 and speaker 163. The audio data and video data may be arranged in frames, and the audio frames may be time-synchronized with the video frames when rendered. In examples according to this disclosure, the audio and video data received from source device 120 on dashboard sink device 160 and rendered by display 162 may enable presentation of and interaction with data and applications resident on source device 120, which may include, e.g., a mobile phone with navigation, contacts, calendar, e-mail, and other applications.

Audio/video encoder 124 and audio/video decoder 164 may implement any number of audio and video compression standards, such as the ITU-T H.264 standard, alternatively referred to as MPEG-4, Part 10, Advanced Video Coding (AVC), or the newly emerging high efficiency video coding (HEVC) standard, sometimes called the H.265 standard. Many other types of proprietary or standardized compression techniques may also be used. Generally speaking, audio/video decoder 164 is configured to perform the reciprocal coding operations of audio/video encoder 124. Although not shown in FIG. 1A, in some aspects, A/V encoder 124 and A/V decoder 164 may each be integrated with an audio encoder and decoder, and may include appropriate MUX-DEMUX units, or other hardware and software, to handle encoding of both audio and video in a common data stream or separate data streams.

As will be described in more detail below, A/V encoder 124 may also perform other encoding functions in addition to implementing a video compression standard as described above. For example, A/V encoder 124 may add various types of metadata to A/V data 121 prior to A/V data 121 being transmitted to sink device 160. In some instances, A/V data 121 may be stored on or received at source device 120 in an encoded form and thus not require further compression by A/V encoder 124.

Although, FIG. 1A shows communication channel 150 carrying audio payload data and video payload data separately, it is to be understood that in some instances video payload data and audio payload data may be part of a common data stream. If applicable, MUX-DEMUX units may conform to the ITU H.223 multiplexer protocol, or other protocols such as the user datagram protocol (UDP). Audio/video encoder 124 and audio/video decoder 164 each may be implemented as one or more microprocessors, digital signal processors (DSPs), application specific integrated circuits (ASICs), field programmable gate arrays (FPGAs), discrete logic, software, hardware, firmware or any combinations thereof. Each of audio/video encoder 124 and audio/video decoder 164 may be included in one or more encoders or decoders, either of which may be integrated as part of a combined encoder/decoder (CODEC). Thus, each of source device 120 and sink device 160 may comprise specialized machines configured to execute one or more of the techniques of this disclosure.

Display 122 and display 162 may comprise any of a variety of video output devices such as a cathode ray tube (CRT), a liquid crystal display (LCD), a plasma display, a light emitting diode (LED) display, an organic light emitting diode (OLED) display, or another type of display device. In these or other examples, the displays 122 and 162 may each be emissive displays or transmissive displays. Display 122 and display 162 may also be touch displays such that they are simultaneously both input devices and display devices. Such touch displays may be capacitive, resistive, or other type of touch panel that allows a user to provide user input to the respective device.

Speaker 123 may comprise any of a variety of audio output devices such as headphones, a single-speaker system, a multi-speaker system, or a surround sound system. Additionally, although display 122 and speaker 123 are shown as part of source device 120 and display 162 and speaker 163 are shown as part of sink device 160, source device 120 and sink device 160 may in fact be a system of devices. As one example, speaker 163 of dashboard sink device 160 may include a speaker of the automobile in which the dashboard sink device is arranged. Additionally, although not shown in FIG. 1A, dashboard sink device 160 may include or provide access to other peripheral devices of the automobile in which it is arrange, including, e.g., a microphone or additional display devices like backseat DVD/display devices. In some cases, the source device may comprise a mobile device, such as a smartphone, laptop or tablet computer, while the sink device includes the more stationary automobile dashboard (stationary with respect to movement independent of the motion of the automobile).

Transmitter/receiver unit 126 and transmitter/receiver unit 166 may each include various mixers, filters, amplifiers and other components designed for signal modulation, as well as one or more antennas and other components designed for transmitting and receiving data. Communication channel 150 generally represents any suitable communication medium, or collection of different communication media, for transmitting video data from source device 120 to sink device 160. Communication channel 150 is usually a relatively short-range communication channel, similar to Wi-Fi, Bluetooth, or the like. However, communication channel 150 is not necessarily limited in this respect, and may comprise any wireless or wired communication medium, such as a radio frequency (RF) spectrum or one or more physical transmission lines, or any combination of wireless and wired media. In other examples, communication channel 150 may even form part of a packet-based network, such as a wired or wireless local area network, a wide-area network, or a global network such as the Internet. Additionally, communication channel 150 may be used by source device 120 and sink device 160 to create a peer-to-peer link. Source device 120 and sink device 160 may communicate over communication channel 150 using a communications protocol such as a standard from the IEEE 802.11 family of standards. Source device 120 and sink device 160 may, for example, communicate according to the Wi-Fi Direct standard, such that source device 120 and sink device 160 communicate directly with one another without the use of an intermediary such as a wireless access points or so called hotspot. Source device 120 and sink device 160 may also establish a tunneled direct link setup (TLDS) to avoid or reduce network congestion. The techniques of this disclosure may at times be described with respect to Wi-Fi, but it is contemplated that aspects of these techniques may also be compatible with other communication protocols. For example, the wireless communication between source device 120 and sink device may utilize orthogonal frequency division multiplexing (OFDM) techniques. A wide variety of other wireless communication techniques may also be used, including time division multi access (TDMA), frequency division multi access (FDMA), code division multi access (CDMA), or any combination of OFDM, FDMA, TDMA and/or CDMA. WiFi Direct and TDLS are intended to setup relatively short-distance communication sessions. Relatively short distance in this context may refer to, for example, less than 70 meters, although in a noisy or obstructed environment the distance between devices may be even shorter, such as less than 35 meters.

In addition to decoding and rendering data received from source device 120, sink device 160 can also receive user inputs from user input device 167. User input device 167 may, for example, be a keyboard, mouse, trackball or track pad, touch screen, voice command recognition module, or any other such user input device. User input processing module (UIPM) 168 formats user input commands received by user input device 167 into a data packet structure that source device 120 is capable of interpreting. Such data packets are transmitted by transmitter/receiver 166 to source device 120 over communication channel 150. Transmitter/receiver unit 126 receives the data packets, and A/V control module 125 parses the data packets to interpret the user input command that was received by user input device 167. Based on the command received in the data packet, A/V control module 125 can change the content being encoded and transmitted. In this manner, a user of sink device 160 can control the audio payload data and video payload data being transmitted by source device 120 remotely and without directly interacting with source device 120.

Examples of the types of commands a user of sink device 160 may transmit to source device 120 include commands for rewinding, fast forwarding, pausing, and playing audio and video data, as well as commands for zooming, rotating, scrolling, and so on. Users may also make selections, from a menu of options for example, and transmit the selection back to source device 120. For example, users may make selections at user input device 167 of dashboard sink 160 of various types of input controls provided as part of a graphical user interface (GUI) of an application, e.g. an e-mail, calendar, or contact application resident on source device 120. Such interaction with the GUI of the application on source device 120 at sink device 160 may then be formatted by UIPM 168 and transmitted by transmitter/receiver 166 to source device 120 over communication channel 150.

Additionally, users of sink device 160 may be able to launch and control other types of applications on source device 120. For example, a user of sink device 160 may able to launch a photo editing application stored on source device 120 and use the application to edit a photo that is stored locally on source device 120. Sink device 160 may present a user with a user experience that looks and feels like the photo is being edited locally on sink device 160 while in fact the photo is being edited on source device 120. Using such a configuration, a device user may be able to leverage the capabilities of one device for use with several devices.

For example, source device 120 may be a smartphone with a large amount of memory and high-end processing capabilities. A user of source device 120 may use the smartphone in all the settings and situations smartphones are typically used. However, when siting and/or traveling in an automobile, the user may wish to leverage applications resident on the smartphone on dashboard sink device 160, e.g. using a navigation application on source device 120 on the display of dashboard sink device 160. In such instances, the bulk of the processing may still be performed by source device 120 (a smartphone in this example) even though the user is interacting with dashboard sink device 160. In this particular operating context, due to the bulk of the processing being performed by source device 120, sink device 160 may be a lower cost device with fewer resources than if sink device 160 were being asked to do the processing being done by source device 120. Both the source device and the sink device may be capable of receiving user input (such as touch screen commands) in some examples, and the techniques of this disclosure may facilitate two way interaction by negotiating and or identifying the capabilities of the devices in any given session. Thus, in examples according to this disclosure in which sink device 120 is included in an automobile dashboard, a user may interact with applications executed on and data stored on source device 120 at dashboard sink device 160, including, e.g., interacting with contact, navigation, calendar, e-mail, and other applications stored and executed on source device 120 via user input device 167 on dashboard sink device 160.

In some configurations, A/V control module 125 may be an operating system process being executed by the operating system of source device 125. In other configurations, however, A/V control module 125 may be a software process of an application running on source device 120. In such a configuration, the user input command may be interpreted by the software process, such that a user of sink device 160 is interacting directly with the application running on source device 120, as opposed to the operating system running on source device 120. By interacting directly with an application as opposed to an operating system, a user of sink device 160 may have access to a library of commands that are not native to the operating system of source device 120. Additionally, interacting directly with an application may enable commands to be more easily transmitted and processed by devices running on different platforms.

Source device 120 can respond to user inputs applied at wireless sink device 160. In such an interactive application setting, the user inputs applied at wireless sink device 160 may be sent back to the wireless display source over communication channel 150. In one example, a reverse channel architecture, also referred to as a user interface back channel (UIBC) may be implemented to enable sink device 160 to transmit the user inputs applied at sink device 160 to source device 120. The reverse channel architecture may include upper layer messages for transporting user inputs and lower layer frames for negotiating user interface capabilities at sink device 160 and source device 120. The UIBC may reside over the Internet Protocol (IP) transport layer between sink device 160 and source device 120. In this manner, the UIBC may be above the transport layer in the Open System Interconnection (OSI) communication model. In one example, the OSI communication includes seven layers (1—physical, 2—data link, 3—network, 4—transport, 5—session, 6—presentation, and 7—application). In this example, being above transport layer refers to layers 5, 6, and 7. To promote reliable transmission and in sequence delivery of data packets containing user input data, UIBC may be configured to run on top of other packet-based communication protocols such as the transmission control protocol/internet protocol (TCP/IP) or the user datagram protocol (UDP). UDP and TCP can operate in parallel in the OSI layer architecture. TCP/IP can enable sink device 160 and source device 120 to implement retransmission techniques in the event of packet loss.

In some cases, there may be a mismatch between the user input interfaces located at source device 120 and sink device 160. To resolve the potential problems created by such a mismatch and to promote a good user experience under such circumstances, user input interface capability negotiation may occur between source device 120 and sink device 160 prior to establishing a communication session or at various times throughout a communication session. As part of this negotiation process, source device 120 and sink device 160 can agree on a negotiated screen resolution. When sink device 160 transmits coordinate data associated with a user input, sink device 160 can scale coordinate data obtained from display 162 to match the negotiated screen resolution. In one example, if sink device 160 has a 1280×720 resolution and source device 120 has a 1600×900 resolution, the devices may, for example, use 1280×720 as their negotiated resolution. The negotiated resolution may be chosen based on a resolution of sink device 160, although a resolution of source device 120 or some other resolution may also be used. In the example where the sink device of 1280×720 is used, sink device 160 can scale obtained x-coordinates by a factor of 1600/1280 prior to transmitting the coordinates to source device 120, and likewise, sink device 160 can scale obtained y-coordinates by 900/720 prior to transmitting the coordinates to source device 120. In other configurations, source device 120 can scale the obtained coordinates to the negotiated resolution. The scaling may either increase or decrease a coordinate range based on whether sink device 160 uses a higher resolution display than source device 120, or vice versa.

Additionally, in some instances, the resolution at sink device 160 may vary during a communication session, potentially creating a mismatch between display 122 and display 162. In order to improve the user experience and to ensure proper functionality, source/sink system 100 may implement techniques for reducing or preventing user interaction mismatch by implementing techniques for screen normalization. Display 122 of source device 120 and display 162 of sink device 160 may have different resolutions and/or different aspects ratios. Additionally, in some settings, a user of sink device 160 may have the ability to resize a display window for the video data received from source device 120 such that the video data received from source device 120 is rendered in a window that covers less than all of display 162 of sink device 160. In another example setting, a user of sink device 160 may have the option of viewing content in either a landscape mode or a portrait mode, each of which has unique coordinates and different aspect ratios. In such situations, coordinates associated with a user input received at sink device 160, such as the coordinate for where a mouse click or touch event occurs, may not able to be processed by source device 120 without modification to the coordinates. Accordingly, techniques of this disclosure may include mapping the coordinates of the user input received at sink device 160 to coordinates associated with source device 120. This mapping is also referred to as normalization herein, and as will be explained in greater detail below, this mapping can be either sink-based or source-based.

User inputs received by sink device 160 can be received by UI module 167, at the driver level for example, and passed to the operating system of sink device 160. The operating system on sink device 160 can receive coordinates ($x_{SINK}$, $y_{SINK}$) associated with where on a display area a user input occurred. In this example, ($x_{SINK}$, $y_{SINK}$) can be coordinates of display 162 where a mouse click or a touch event occurred. The display window being rendered on display 162 can have an x-coordinate length ($L_{DW}$) and a y-coordinate width ($W_{DW}$) that describe the size of the display window. The display window can also have an upper left corner coordinate ($a_{DW}$, $b_{DW}$) that describes the location of the display window. Based on $L_{DW}$, $W_{DW}$, and the upper left coordinate ($a_{DW}$, $b_{DW}$), the portion of display 162 covered by the display window can be determined. For example, an upper right corner of the display window can be located at coordinate ($a_{DW}+L_{DW}$, $b_{DW}$), a lower left corner of the display window can be located at coordinate ($a_{DW}$, $b_{DW}+W_{DW}$), and a lower right corner of the display window can be located at coordinate ($a_{DW}+L_{DW}$, $b_{DW}+W_{DW}$). Sink device 160 can process an input as a UIBC input if the input is received at a coordinate within the display window. In other words, an input with associated coordinates ($x_{SINK}$, $y_{SINK}$) can be processed as a UIBC input if the following conditions are met:

$$a_{DW} \leq x_{SINK} \leq a_{DW}+L_{DW} \quad (1)$$

$$b_{DW} \leq y_{SINK} \leq b_{DW}+W_{DW} \quad (2)$$

After determining that a user input is a UIBC input, coordinates associated with the input can be normalized by UIPM 168 prior to being transmitted to source device 120. Inputs that are determined to be outside the display window can be processed locally by sink device 160 as non-UIBC inputs.

As mentioned above, the normalization of input coordinates can be either sourced-based or sink-based. When implementing sink-based normalization, source device 120 can send a supported display resolution ($L_{SRC}$, $W_{SRC}$) for display 122, either with video data or independently of video data, to sink device 160. The supported display resolution may, for example, be transmitted as part of a capability negotiation session or may be transmitted at another time during a communication session. Sink device 160 can determine a display resolution ($L_{SINK}$, $W_{SINK}$) for display 162, the display window resolution ($L_{DW}$, $W_{DW}$) for the window displaying the content received from source device 120, and the upper left corner coordinate ($a_{DW}$, $b_{DW}$) for the display window. As described above, when a coordinate ($x_{SINK}$, $y_{SINK}$) corresponding to a user input is determined to be within the display window, the operating system of sink device 160 can map the coordinate ($x_{SINK}$, $y_{SINK}$) to source coordinates ($x_{SRC}$, $y_{SRC}$) using conversion functions. Example conversion functions for converting ($x_{SINK}$, $y_{SINK}$) to ($x_{SRC}$, $y_{SRC}$) can be as follows:

$$x_{SRC}=(x_{SINK}-a_{DW})*(L_{SRC}/L_{DW}) \quad (3)$$

$$y_{SRC}=(y_{SINK}-b_{DW})*(W_{SRC}/W_{DW}) \quad (4)$$

Thus, when transmitting a coordinate corresponding to a received user input, sink device 160 can transmit the coordinate ($x_{SRC}$, $y_{SRC}$) for a user input received at ($x_{SINK}$, $Y_{SINK}$). As will be described in more detail below, coordinate ($x_{SRC}$, $y_{SRC}$) may, for example, be transmitted as part of a data packet used for transmitting user input received at sink device 160 to source device 120 over the UIBC. Throughout other portions of this disclosure, where input coordinates are described as being included in a data packet, those coordinates can be converted to source coordinates as described above in instances where source/sink system 100 implements sink-based normalization.

When source/sink system 100 implements sourced-based normalization, for user inputs determined to by UIBC inputs as opposed to local inputs (i.e. within a display window as opposed to outside a display window), the calculations above can be performed at source device 120 instead of sink device 160. To facilitate such calculations, sink device 160 can transmit to source device 120 values for $L_{DW}$, $W_{uw}$, and location information for the display window (e.g. $a_{DW}$, $b_{DW}$), as well as coordinates for ($x_{SINK}$, $y_{SINK}$). Using these transmitted values, source device 120 can determine values for ($x_{SRC}$, $y_{SRC}$) according to equations 3 and 4 above.

In other implementations of sink-based normalization, sink device 160 can transmit coordinates ($x_{DW}$, $y_{DW}$) for a user input that describe where within the display window a user input event occurs as opposed to where on display 162 the user input even occurs. In such an implementation, coordinates ($x_{DW}$, $y_{DW}$) can be transmitted to source device 120 along with values for ($L_{DW}$, $W_{DW}$). Based on these received values, source device 120 can determine ($x_{SRC}$, $y_{SRC}$) according to the following conversion functions:

$$x_{SRC}=x_{DW}*(L_{SRC}/L_{DW}) \quad (5)$$

$$y_{SRC}=y_{DW}*(W_{SRC}/W_{DW}) \quad (6)$$

Sink device 160 can determine $x_{DW}$ and $y_{DW}$ based on the following functions:

$$x_{DW} = x_{SINK} - a_{DW} \quad (7)$$

$$y_{DW} = y_{SINK} - b_{DW} \quad (8)$$

When this disclosure describes transmitting coordinates associated with a user input, in a data packet for example, the transmission of these coordinates may include sink-based or source-based normalization as described above, and/or may include any additional information necessary for performing the sink-based or source-based normalization.

The UIBC may be designed to transport various types of user input data, including cross-platform user input data. For example, source device 120 may run the iOS® operating system, while sink device 160 runs another operating system such as Android® or Windows®, or a proprietary operating system of the manufacturer of dashboard sink device 160 and/or of the automobile in which the dashboard is arranged. Regardless of platform, UIPM 168 can encapsulate received user input in a form understandable to A/V control module 125. A number of different types of user input formats may be supported by the UIBC so as to allow many different types of source and sink devices to exploit the protocol regardless of whether the source and sink devices operate on different platforms. Generic input formats may be defined, and platform specific input formats may both be supported, thus providing flexibility in the manner in which user input can be communicated between source device 120 and sink device 160 by the UIBC.

In the example of FIG. 1A, source device 120 may comprise a smartphone, tablet computer, laptop computer, desktop computer, Wi-Fi enabled television, or any other device capable of transmitting audio and video data. In examples according to this disclosure, sink device 160 forms part or all of a dashboard in an automobile or other type of vehicle. In some instances, dashboard sink device 160 may include a system of devices, such that display 162, speaker 163, UI device 167, and A/V encoder 164 all parts of separate but interoperative devices in the automobile in which the dashboard is arranged. Source device 120 may likewise be a system of devices rather than a single device.

Figure 1B:
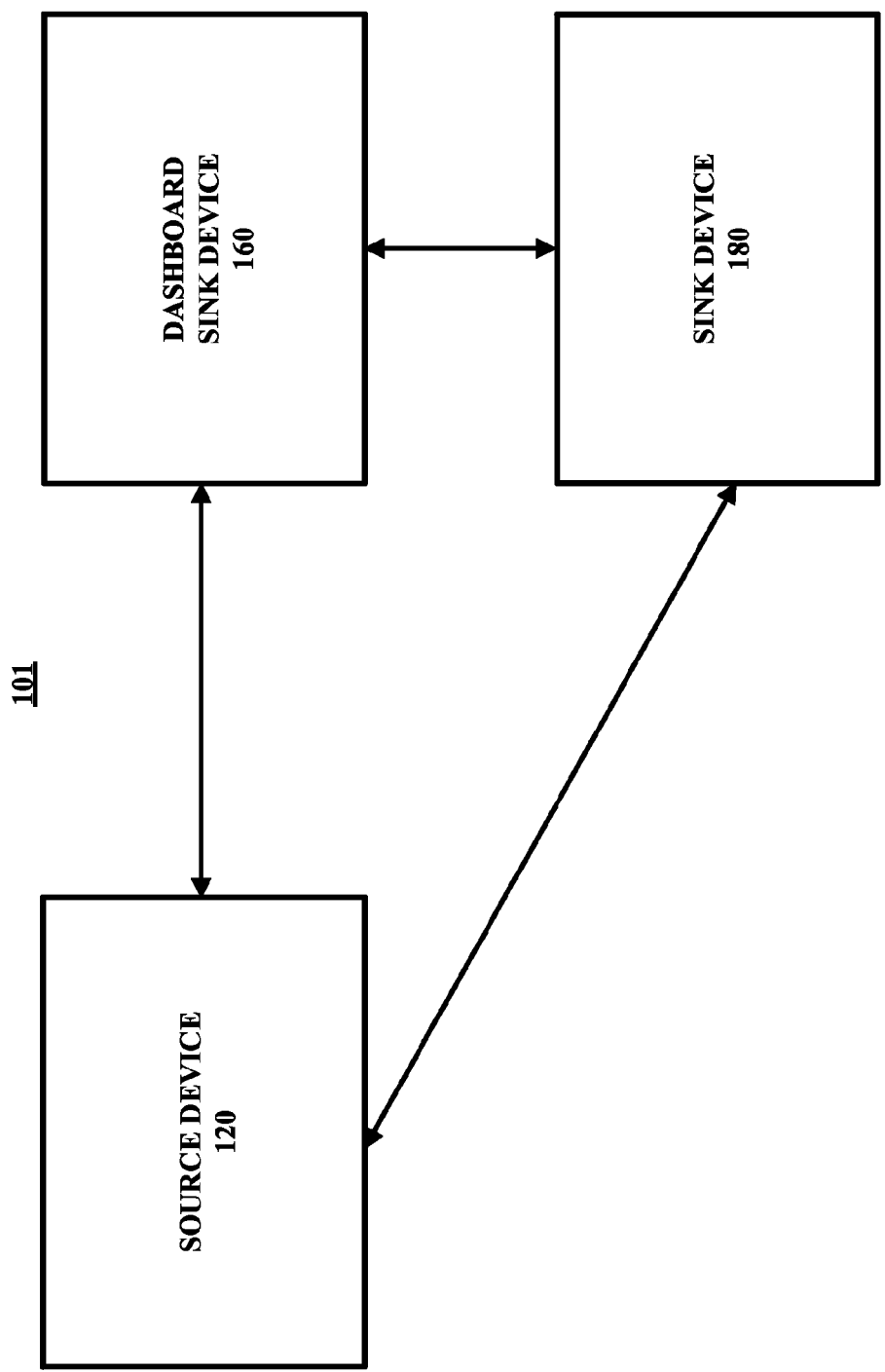
FIG. 1B is a block diagram illustrating an example of a source/sink system with two sink devices.

FIG. 1B is a block diagram illustrating an exemplary source/sink system 101 that may implement techniques of this disclosure. Source/sink system 101 includes source device 120 and dashboard sink device 160, each of which may function and operate in the manner described above for FIG. 1A. Source/sink system 101 further includes sink device 180. In a similar manner to dashboard sink device 160 described above, sink device 180 may receive audio and video data from source device 120 and transmit user commands to source device 120 over an established UIBC. In some configurations, dashboard sink device 160 and sink device 180 may operate independently of one another, and audio and video data output at source device 120 may be simultaneously output at dashboard sink device 160 and sink device 180. In alternate configurations, dashboard sink device 160 may be a primary sink device and sink device 180 may be a secondary sink device. In such an example configuration, dashboard sink device 160 and sink device 180 may be coupled, and dashboard sink device 160 may display video data while sink device 180 outputs corresponding audio data. Additionally, in some configurations, dashboard sink device 160 may output transmitted video data only while sink device 180 outputs transmitted audio data only.

Figure 2:
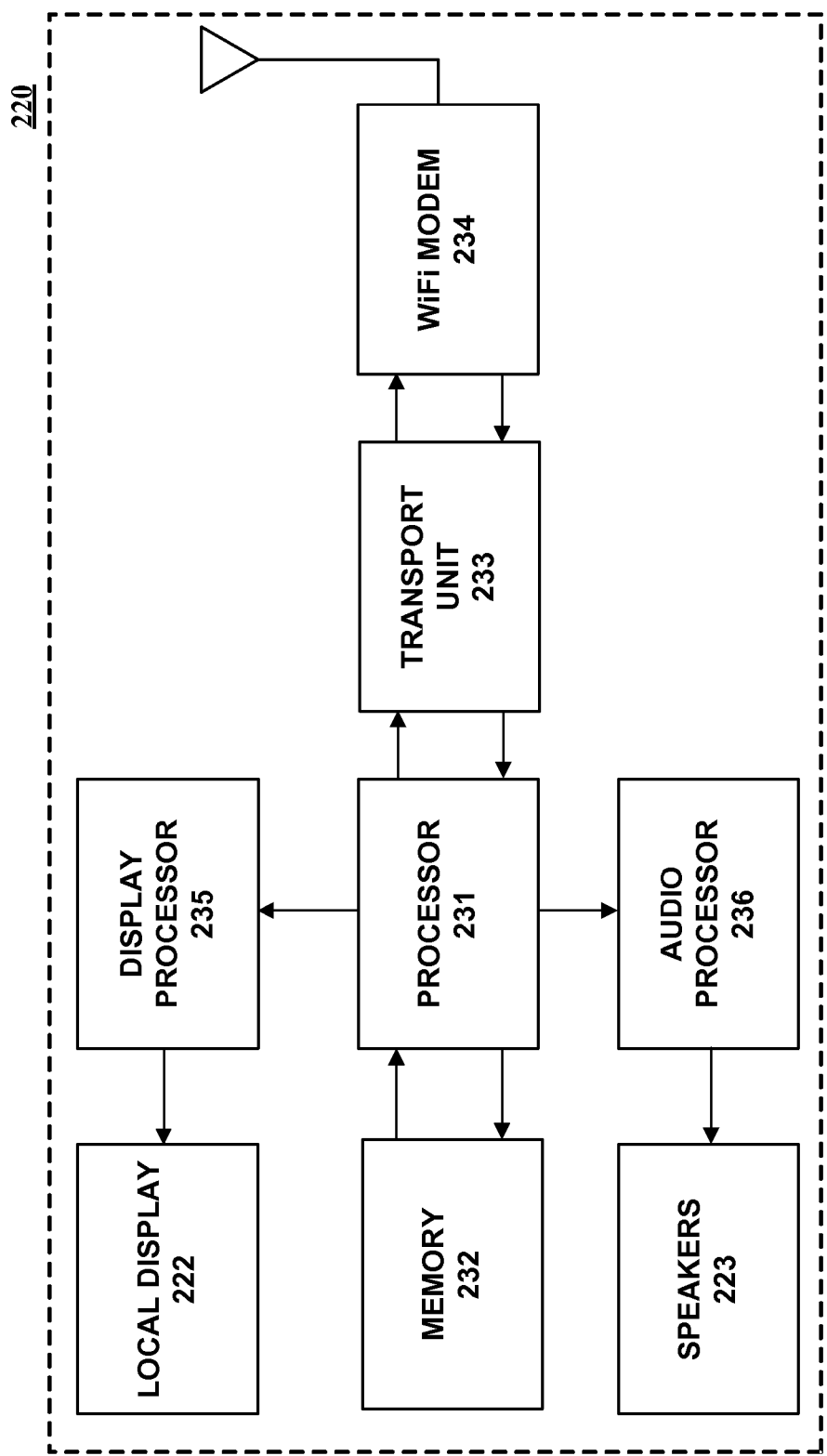
FIG. 2 shows an example of a source device that may implement techniques of this disclosure.

FIG. 2 is a block diagram showing one example of a source device 220. Source device 220 may be a device similar to source device 120 in FIG. 1A and may operate in the same manner as source device 120. Source device 220 includes local display 222, local speaker 223, processors 231, memory 232, transport unit 233, and wireless modem 234. As shown in FIG. 2, source device 220 may include one or more processors (i.e. processor 231) that encode and/or decode A/V data for transport, storage, and display. The A/V data may for example be stored at memory 232. Memory 232 may store an entire A/V file, or may comprise a smaller buffer that simply stores a portion of an A/V file, e.g., streamed from another device or source. Transport unit 233 may process encoded A/V data for network transport. For example, encoded A/V data may be processed by processor 231 and encapsulated by transport unit 233 into Network Access Layer (NAL) units for communication across a network. The NAL units may be sent by wireless modem 234 to a wireless sink device via a network connection. Wireless modem 234 may, for example, be a Wi-Fi modem configured to implement one of the IEEE 802.11 family of standards.

Source device 220 may also locally process and display A/V data. For example, display processor 235 may process video data to be displayed on local display 222, and audio processor 236 may process audio data for output on speaker 223.

As described above with reference to source device 120 of FIG. 1A, source device 220 may also receive user input commands from a sink device. In this manner, wireless modem 234 of source device 220 receives encapsulated data packets, such as NAL units, and sends the encapsulated data units to transport unit 233 for decapsulation. For instance, transport unit 233 may extract data packets from the NAL units, and processor 231 can parse the data packets to extract the user input commands. Based on the user input commands, processor 231 can adjust the encoded A/V data being transmitted by source device 220 to a sink device. In this manner, the functionality described above in reference to A/V control module 125 of FIG. 1A may be implemented, either fully or partially, by processor 231.

Processor 231 of FIG. 2 generally represents any of a wide variety of processors, including but not limited to one or more digital signal processors (DSPs), general purpose microprocessors, application specific integrated circuits (ASICs), field programmable logic arrays (FPGAs), other equivalent integrated or discrete logic circuitry, or some combination thereof. Memory 232 of FIG. 2 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like, Memory 232 may comprise a computer-readable storage medium for storing audio/video data, as well as other kinds of data. Memory 232 may additionally store instructions and program code that are executed by processor 231 as part of performing the various techniques described in this disclosure.

In one example, memory 232 of source device 220 may store an application executable by processor 231 that is configured to facilitate communications between source device 220 and a dashboard sink device in an automobile. Such a source device dashboard application may be authenticated by the dashboard manufacturer and/or automobile manufacturer to initiate and manage communications between source device 220 and an automobile dashboard sink device. The source device application may include a variety of functions including, e.g., mirroring native functions of the automobile dashboard on the source device and receiving and processing automobile data received from the automobile dashboard sink device.

In one example according to this disclosure, source device 220 may be a smartphone with memory 232 including a relatively a large amount storage capacity and processor 231 with relatively high-end processing capabilities. A user of source device 220 may use the smartphone in all the settings and situations smartphones are typically used. However, when siting and/or traveling in an automobile, the user may wish to leverage applications resident on the smartphone on a dashboard sink device that has authenticated source device 220 for communications therewith, e.g. using a navigation application stored on source device 220 on the display of the dashboard sink device in the automobile. Thus, in examples according to this disclosure in which a sink device forms part or all of an automobile dashboard, a user may interact with applications executed on and data stored on source device 220 at a dashboard sink device, including, e.g., interacting with contact, navigation, calendar, e-mail, and other applications stored and executed on source device 120 via various user input devices on the dashboard sink device.

Figure 3:
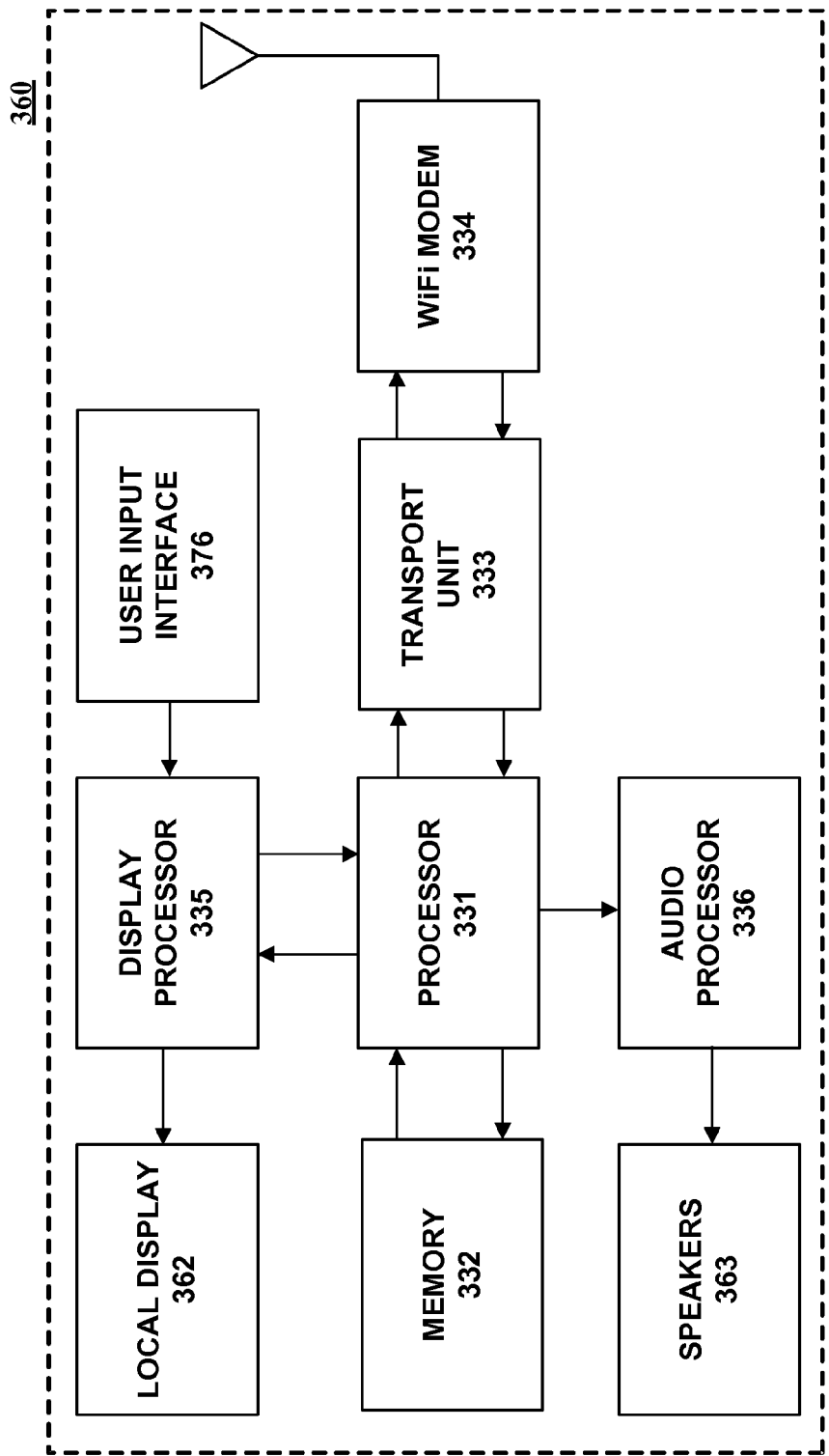
FIG. 3 shows an example of a sink device that may implement techniques of this disclosure.

FIG. 3 shows an example of an automobile dashboard sink device 360. Sink device 360 may be a device similar to dashboard sink device 160 in FIG. 1A and may operate in the same manner as sink device 160. Sink device 360 includes one or more processors (i.e. processor 331), memory 332, transport unit 333, wireless modem 334, display processor 335, local display 362, audio processor 336, speaker 363, and user input interface 376. Sink device 360 receives at wireless modem 334 encapsulated data units sent from a source device. Wireless modem 334 may, for example, be a Wi-Fi modem configured to implement one more standards from the IEEE 802.11 family of standards. Transport unit 333 can decapsulate the encapsulated data units. For instance, transport unit 333 may extract encoded video data from the encapsulated data units and send the encoded A/V data to processor 331 to be decoded and rendered for output. Display processor 335 may process decoded video data to be displayed on local display 362, and audio processor 336 may process decoded audio data for output on speaker 363.

In addition to rendering audio and video data, wireless dashboard sink device 360 can also receive user input data through user input interface 376. User input interface 376 can represent any of a number of user input devices included but not limited to a touch display interface, a keyboard, a mouse, a voice command module, gesture capture device (e.g., with camera-based input capturing capabilities) or any other of a number of user input devices. User input received through user input interface 376 can be processed by processor 331. This processing may include generating data packets that include the received user input command in accordance with the techniques described in this disclosure. Once generated, transport unit 333 may process the data packets for network transport to a wireless source device over a UIBC.

Processor 331 of FIG. 3 may comprise one or more of a wide range of processors, such as one or more digital signal processors (DSPs), general purpose microprocessors, application specific integrated circuits (ASICs), field programmable logic arrays (FPGAs), other equivalent integrated or discrete logic circuitry, or some combination thereof. Memory 332 of FIG. 3 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like, Memory 232 may comprise a computer-readable storage medium for storing audio/video data, as well as other kinds of data. Memory 332 may additionally store instructions and program code that are executed by processor 331 as part of performing the various techniques described in this disclosure.

In one example, memory 332 of sink device 360 may store an application executable by processor 331 that is configured to facilitate communications between a source device, e.g. source device 220 and dashboard sink device 360. Such a sink device dashboard application may be a Wireless Display (WIDI) application that facilitates pairing and wireless communications between a source device and dashboard sink device 360 forming part or the entire dashboard in an automobile. In one example, the sink device dashboard application may be compliant with one or more standards associated with WFD systems and communication sessions. In another example, the sink device dashboard application may facilitate communications between source devices and dashboard sink device 360 outside of WFD standards, e.g. via one or more proprietary protocols of the dashboard and/or automobile manufacturer and using, e.g., an out of band TCP/IP link between the source and dashboard sink devices.

The sink device dashboard application or another application stored on memory 332 and executed by processor 331 of dashboard sink device 360 may also include an agent that communicates with systems and devices of the automobile in which sink device 360 is arranged. For example, various devices of the automobile in which dashboard sink device 360 is arranged, e.g. an ECU and one or more sensors of the automobile may generate data related to the operation of the automobile. An agent stored on memory 332 and executed by processor 331 of dashboard sink device 360 may be configured to interface with and retrieve or receive such automobile data, which may then, in some examples, be transmitted to and processed in a variety of ways by a source device. For example, gas mileage data tracked and stored by sensors and the engine control unit (ECU) of the automobile may be retrieved by the agent executed on dashboard sink device 360. Additionally, other relevant operational data of the automobile like speed, acceleration, braking, and other data related to driving habits and metrics may be retrieved by the agent from one or more components of the automobile. This automobile data may be transmitted by dashboard sink device 360, e.g., by transport unit 333 encapsulating the automobile data and Wi-Fi modem 334 transmitting the data to a wireless source device, e.g. to a user's mobile phone. The mobile phone may include various functions for processing the data including, e.g., an application that tracks and organizes gas mileage data over time, and, in some cases, correlates gas mileage to driving habits/metrics.

A wide variety of automobile data and processing of such data other than the foregoing gas mileage example is contemplated in examples according to this disclosure. For example, error codes from the automobile ECU may be tracked, stored, and communicated from dashboard sink device 360 to a wireless source device like a mobile phone, as well as other diagnostic information related to service, maintenance, and/ or malfunctions of an automobile. Such error or diagnostic information from the automobile in which dashboard sink device is arranged may be tracked and analyzed on a source device like a mobile phone and may even be used, e.g., to automatically request service appointments at a dealership or service station qualified and/or authorized to work on the automobile. In another example, error or diagnostic information from the automobile in which dashboard sink device is arranged may be tracked and analyzed on a source device like a mobile phone and may even be used, e.g., to automatically generate a calendar event, reminder, or task to have the automobile serviced. For example, codes from the automobile ECU that are generated in relation to regular service events, e.g. oil changes or other mileage or time based preventative service checks may be tracked, stored, and communicated from dashboard sink device 360 to a wireless source device like a mobile phone. In such a case, the mobile phone source device could analyze the ECU codes received from dashboard sink device 360 and automatically schedule a calendar event with or without a reminder entitled, e.g., "Oil Change" or "15,000 mile check-up" or the like.

Many details of this disclosure have been described in the context of an automobile. Several examples of automobile-specific data have been described in this context. The techniques described herein, however, may find a wide variety of applications with numerous other types of vehicles, and the vehicle data may differ for such applications. Any vehicle that includes a display device on a dashboard or some equivalent structure can use one or more of the techniques described herein. The data communicated between the dashboard and the source device may be vehicle-specific and may vary depending on the type of vehicle.

Example vehicles that can employ a dashboard sink device in accordance with this disclosure includes automobile, watercraft, aircraft, all-terrain vehicle (ATV), and tanks or other military vehicles, semi-trucks or other transportation vehicles, and bulldozers, tractors, or other heavy machinery, and trains, golf carts, and other types of vehicles. A wide variety of vehicle data and processing of such data is contemplated in examples according to this disclosure.

For example, golf scores, handicaps, performance metrics like birdies, eagles, and bogeys may be tracked, stored, and communicated from a dashboard sink device included in a golf cart to a wireless source device like a mobile phone. Such golfing statistics may be tracked and analyzed on a source device like a mobile phone. For example, golf scores at various golf courses over a period of time may be communicated from dashboard sink devices to a mobile phone source and the mobile phone may compile scores to automatically calculate, track, and update a golfer's handicap.

In another example, parameters related to farming can be tracked, stored, and wirelessly communicated by a dashboard sink device on a tractor to a source device like a mobile phone or laptop computer. For example, harvesting data like crop yields can be tracked and communicated by a dashboard sink device to a mobile phone, which may then store and track crop yields over a number of different harvests.

In another example, mission data can be tracked and wirelessly communicated by a dashboard sink device of a military vehicle to a source device like a mobile phone or laptop computer. For example, data indicating the amount of ammunition fired from an armed military vehicle including a tank, airplane, helicopter or other military vehicle could be tracked and wirelessly communicated by a dashboard sink device on board the military vehicle to a sink device. In such an example, the sink device, e.g., a laptop computer can automatically communicate ammunition data to a command and control system that archives the data for analysis or other reference.

Figure 4:
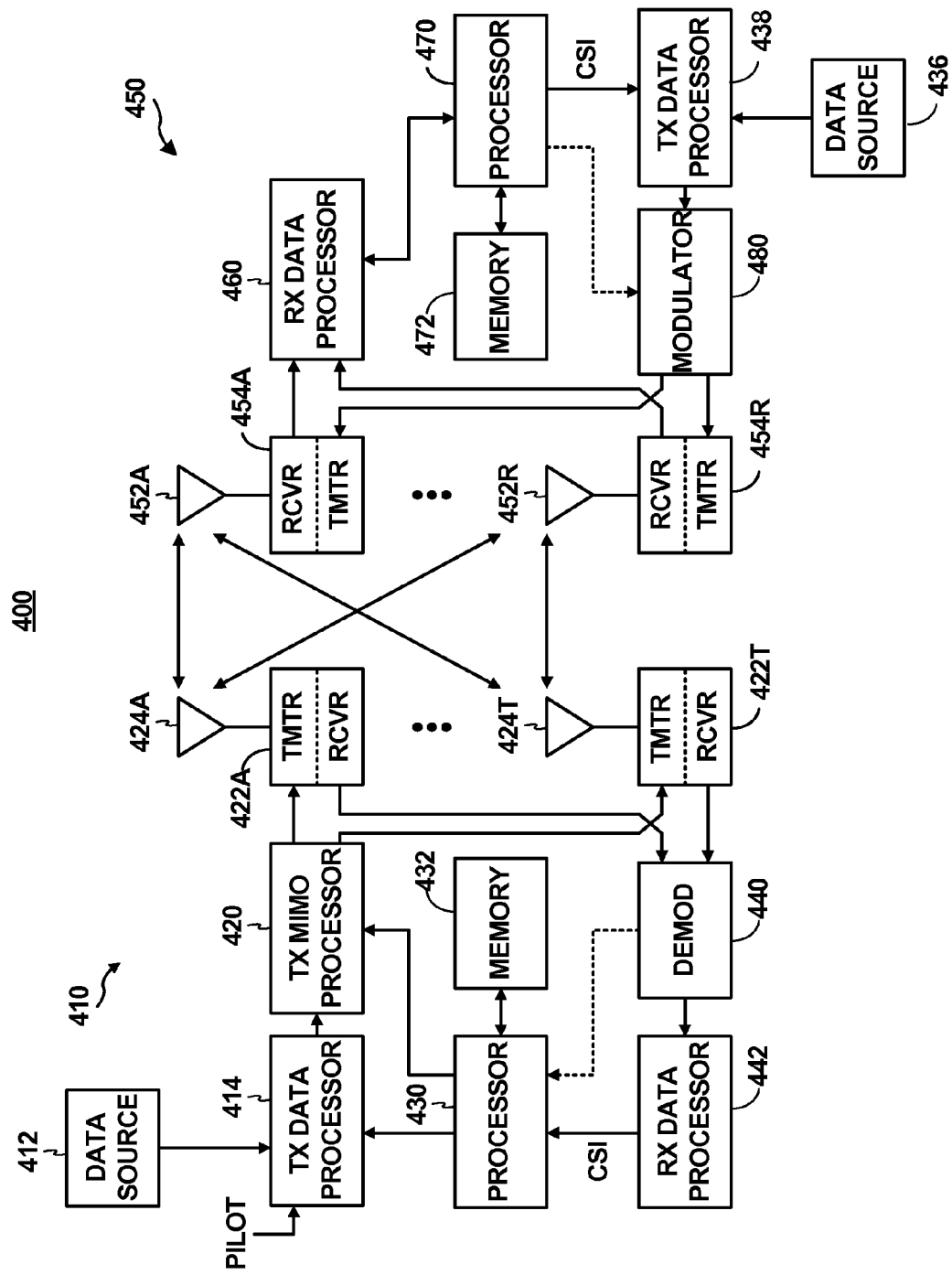
FIG. 4 shows a block diagram of a transmitter system and a receiver system that may implement techniques of this disclosure.

FIG. 4 shows a block diagram of an example transmitter system 410 and receiver system 450, which may be used by transmitter/receiver 126 and transmitter/receiver 166 of FIG. 1A for communicating over communication channel 150. At transmitter system 410, traffic data for a number of data streams is provided from a data source 412 to transmit (TX) data processor 414. Each data stream may be transmitted over a respective transmit antenna. TX data processor 414 formats, codes, and interleaves the traffic data for each data stream based on a particular coding scheme selected for that data stream.

The coded data for each data stream may be multiplexed with pilot data using orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

Consistent with FIG. 4, the pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK, or M-QAM (Quadrature Amplitude Modulation), where M may be a power of two) selected for that data stream to provide modulation symbols. The data rate, coding, and modulation for each data stream may be determined by instructions performed by processor 430 which may be coupled with memory 432.

The modulation symbols for the data streams are then provided to a TX MIMO processor 420, which may further process the modulation symbols (e.g., for OFDM). TX MIMO processor 420 can then provide $N_T$ modulation symbol streams to $N_T$ transmitters (TMTR) 422a through 422t. In certain aspects, TX MIMO processor 420 applies beamforming weights to the symbols of the data streams and to the antenna from which the symbol is being transmitted.

Each transmitter 422 may receive and process a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 422a through 422t are then transmitted from $N_T$ antennas 424a through 424t, respectively.

At receiver system 450, the transmitted modulated signals are received by $N_R$ antennas 452a through 452r and the received signal from each antenna 452 is provided to a respective receiver (RCVR) 454a through 454r. Receiver 454 conditions (e.g., filters, amplifies, and downconverts) a respective received signal, digitizes the conditioned signal to provide samples, and further processes the samples to provide a corresponding "received" symbol stream.

A receive (RX) data processor 460 then receives and processes the $N_R$ received symbol streams from $N_R$ receivers 454 based on a particular receiver processing technique to provide $N_T$ "detected" symbol streams. The RX data processor 460 then demodulates, deinterleaves and decodes each detected symbol stream to recover the traffic data for the data stream. The processing by RX data processor 460 is complementary to that performed by TX MIMO processor 420 and TX data processor 414 at transmitter system 410.

A processor 470 that may be coupled with a memory 472 periodically determines which pre-coding matrix to use. The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reserve link message transmitted by the receiver system 450. Processor 430 then determines which pre-coding matrix to use for determining the beamforming weights then processes the extracted message.

Figure 5A:
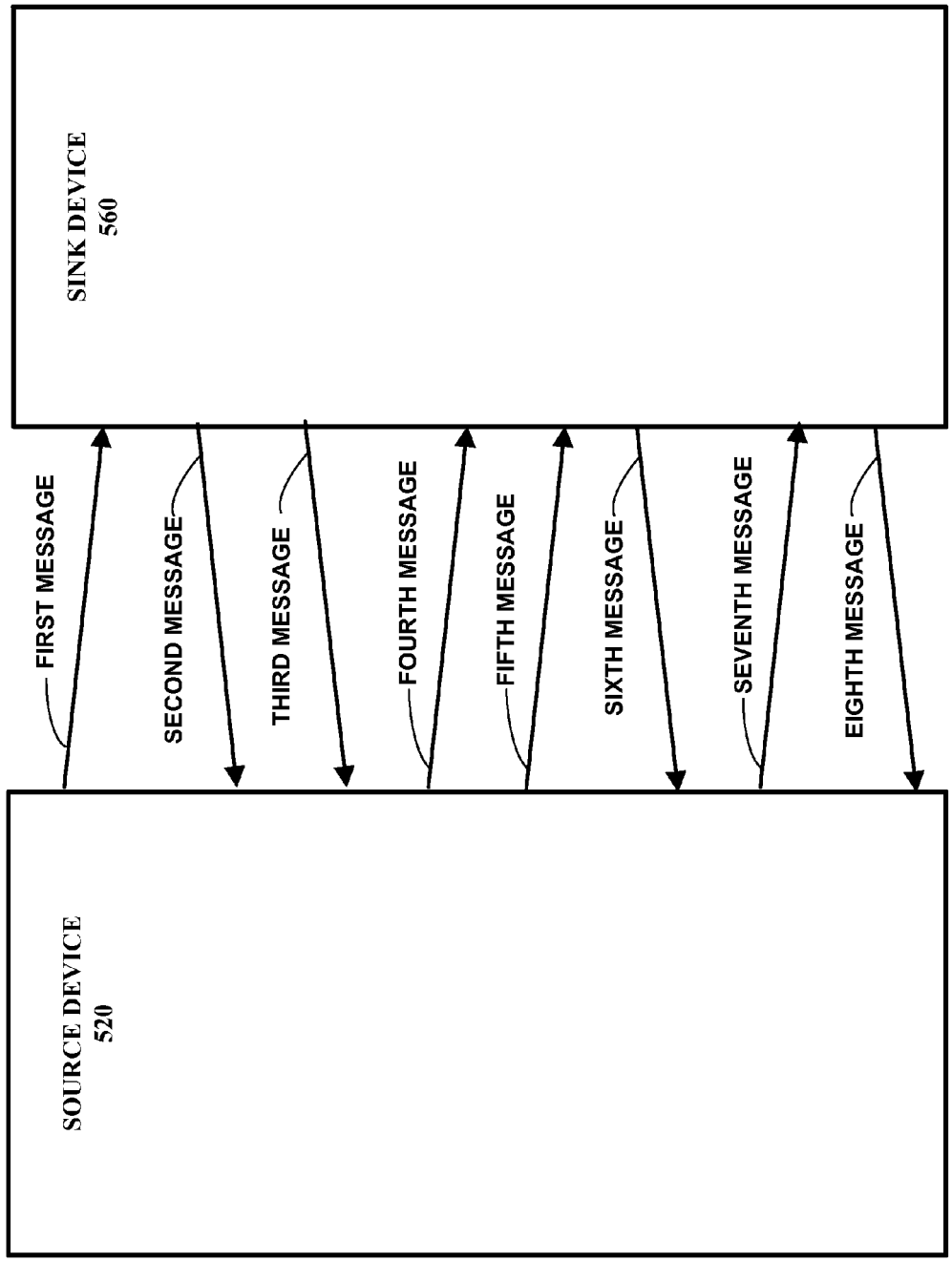
FIGS. 5A and 5B show example message transfer sequences for performing capability negotiations according to techniques of this disclosure.

FIG. 5A is a block diagram illustrating an example message transfer sequence between a source device 520 and a sink device 560 as part of a capabilities negotiations session. Capability negotiation may occur as part of a larger communication session establishment process between source device 520 and sink device 560. This session may, for example, be established with Wi-Fi Direct or TDLS as the underlying connectivity standard. Additionally, as mentioned above, in examples according to this disclosure including communications between a dashboard sink device and an authenticated wireless source device, communication sessions may occur outside of WFD standards, including, e.g. using proprietary protocols and/or other communication means like an out of band TCP/IP link between the source and dashboard sink devices. After establishing the Wi-Fi Direct or TDLS session, sink device 560 can initiate a TCP connection with source device 520. As part of establishing the TCP connection, a control port running a real time streaming protocol (RTSP) can be established to manage a communication session between source device 520 and sink device 560.

Source device 520 may generally operate in the same manner described above for source device 120 of FIG. 1A, and sink device 560 may generally operate in the same manner described above for sink device 160 of FIG. 1A. After source device 520 and sink device 560 establish connectivity, source device 520 and sink device 560 may determine the set of parameters to be used for their subsequent communication session as part of a capability negotiation exchange.

Source device 520 and sink device 560 may negotiate capabilities through a sequence of messages. The messages may, for example, be real time streaming protocol (RTSP) messages. At any stage of the negotiations, the recipient of an RTSP request message may respond with an RTSP response that includes an RTSP status code other than RTSP OK, in which case, the message exchange might be retried with a different set of parameters or the capability negotiation session may be ended.

Source device 520 can send a first message (RTSP OPTIONS request message) to sink device 560 in order to determine the set of RTSP methods that sink device 560 supports. On receipt of the first message from source device 520, sink device 560 can respond with a second message (RTSP OPTIONS response message) that lists the RTSP methods supported by sink 560. The second message may also include a RTSP OK status code.

After sending the second message to source device 520, sink device 560 can send a third message (RTSP OPTIONS request message) in order to determine the set of RTSP methods that source device 520 supports. On receipt of the third message from sink device 560, source device 520 can respond with a fourth message (RTSP OPTIONS response message) that lists the RTSP methods supported by source device 520. The fourth message can also include RTSP OK status code.

After sending the fourth message, source device 520 can send a fifth message (RTSP GET_PARAMETER request message) to specify a list of capabilities that are of interest to source device 520. Sink device 560 can respond with a sixth message (an RTSP GET_PARAMETER response message). The sixth message may contain an RTSP status code. If the RTSP status code is OK, then the sixth message can also include response parameters to the parameter specified in the fifth message that are supported by sink device 560. Sink device 560 can ignore parameters in the fifth message that sink device 560 does not support.

Based on the sixth message, source 520 can determine the optimal set of parameters to be used for the communication session and can send a seventh message (an RTSP SET_PARAMETER request message) to sink device 560. The seventh message can contain the parameter set to be used during the communication session between source device 520 and sink device 560. The seventh message can include the wfd-presentation-url that describes the Universal Resource Identifier (URI) to be used in the RTSP Setup request in order to setup the communication session. The URI may include a uniform resource locator (URL), a uniform resource name (URN) or the like. The wfd-presentation-url specifies the URI that sink device 560 can use for later messages during a session establishment exchange. The wfd-url0 and wfd-url1 values specified in this parameter can correspond to the values of rtp-port0 and rtp-port1 values in the wfd-client-rtp-ports in the seventh message. RTP in this instance generally refers to the real-time protocol which can run on top of the UDP.

Upon receipt of the seventh message, sink device 560 can respond with an eighth message with an RTSP status code indicating if setting the parameters as specified in the seventh message was successful. As mentioned above, the roles or source device and sink device may reverse or change in different sessions. The order of the messages that set up the communication session may, in some cases, define the device that operates as the source and define the device that operates as the sink.

Figure 5B:
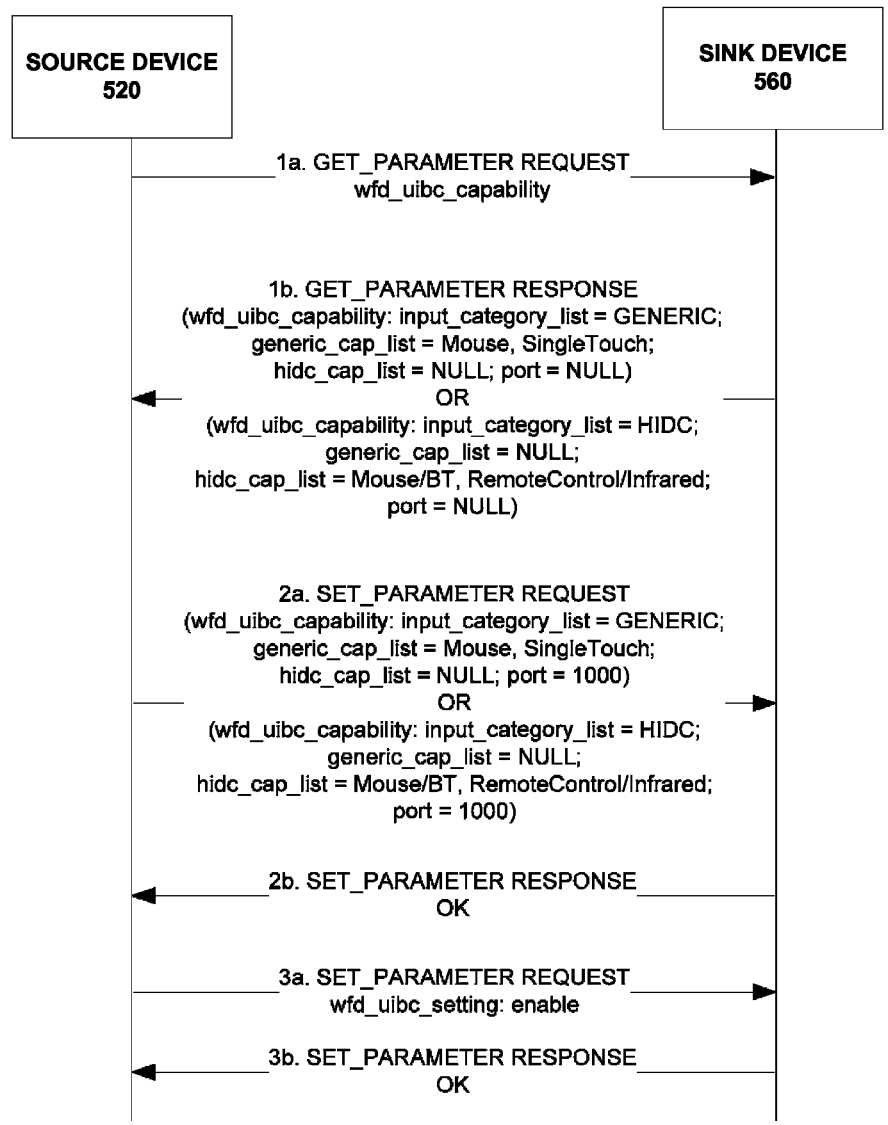

FIG. 5B is a block diagram illustrating another example message transfer sequence between a source device 560 and a sink device 520 as part of capabilities negotiations session. The message transfer sequence of FIG. 5B is intended provide a more detailed view of the transfer sequence described above for FIG. 5A. In FIG. 5B, message "1*b*. GET_PARAMETER RESPONSE" shows an example of a message that identifies a list of supported input categories (e.g. generic and HIDC) and a plurality of lists of supported input types. Each of the supported input categories of the list of supported input categories has an associated list of supported types (e.g. generic_cap_list and hidc_cap_list).

In FIG. 5B, message "2*a*. SET_PARAMETER REQUEST" is an example of a second message that identifies a second list of supported input categories (e.g. generic and HIDC), and a plurality of second lists of supported types. Each of the supported input categories of the second list of supported input categories has an associated second list of supported types (e.g. generic_cap_list and hidc_cap_list). Message "1*b*. GET_PARAMETER RESPONSE" identifies the input categories and input types supported by sink device 560. Message "2*a*. SET_PARAMETER REQUEST" identifies input categories and input types supported by source device 520, but it may not be a comprehensive list of all input categories and input types supported by source device 520. Instead, message "2*a*. SET_PARAMETER REQUEST" may identify only those input categories and input types identified in message "1*b*. GET_PARAMETER RESPONSE" as being supported by sink device 560. In this manner, the input categories and input types identified in message "2*a*. SET_PARAMETER REQUEST" may constitute a subset of the input categories and input types identified in message "1*b*. GET_PARAMETER RESPONSE."

Figure 6:
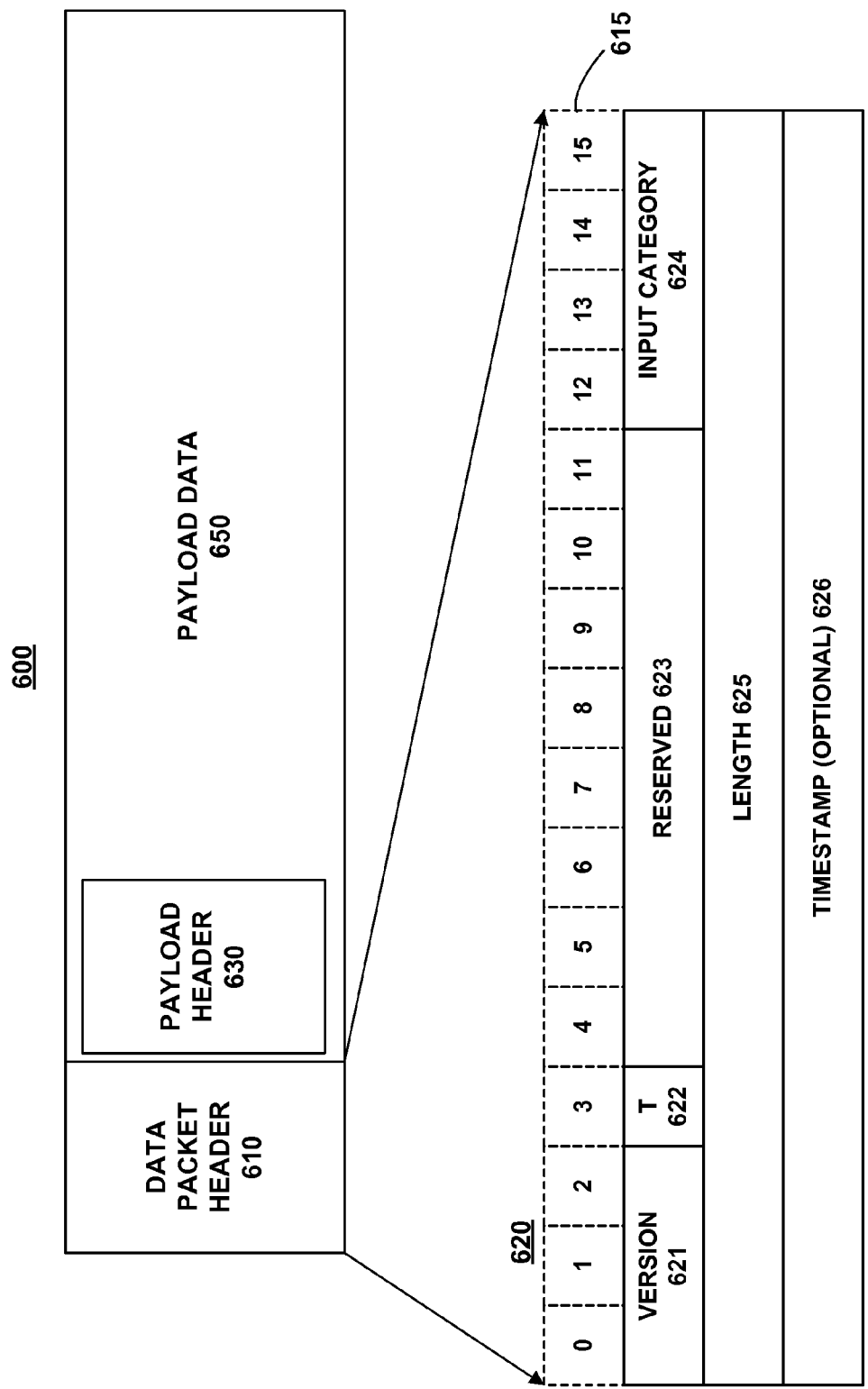
FIG. 6 shows an example data packet that may be used for delivering user input data obtained at a sink device to a source device.

FIG. 6 is a conceptual diagram illustrating one example of a data packet that may be generated by a sink device and transmitted to a source device. Aspects of data packet 600 will be explained with reference to FIG. 1A, but the techniques discussed may be applicable to additional types of source/sink systems. Data packet 600 may include a data packet header 610 followed by payload data 650. Payload data 650 may additionally include one or more payload headers (e.g. payload header 630). Data packet 600 may, for example, be transmitted from sink device 160 of FIG. 1A to source device 120, such that a user of sink device 160 can control audio/video data being transmitted by source device 120. In such an instance, payload data 650 may include user input data received at sink device 160. Payload data 650 may, for example, identify one or more user commands. Sink device 160 can receive the one or more user commands, and based on the received commands, can generate data packet header 610 and payload data 650. Based on the content of data packet header 610 of data packet 600, source device 120 can parse payload data 650 to identify the user input data received at sink device 160. Based on the user input data contained in payload data 650, source device 120 may alter in some manner the audio and video data being transmitted from source device 120 to sink device 160.

As used in this disclosure, the terms "parse" and "parsing" generally refer to the process of analyzing a bitstream to extract data from the bitstream. Once extracted, the data can be processed by source device 120, for example. Extracting data may, for example, include identifying how information in the bitstream is formatted. As will be described in more detail below, data packet header 610 may define a standardized format that is known to both source device 120 and sink device 160. Payload data 650, however, may be formatted in one of many possible ways. By parsing data packet header 610, source device 120 can determine how payload data 650 is formatted, and thus, source device 120 can parse payload data 650 to extract from payload data 650 one or more user input commands. This can provide flexibility in terms of the different types of payload data that can be supported in source-sink communication. As will be described in more detail below, payload data 650 may also include one or more payload headers such as payload header 630. In such instances, source device 120 may parse data packet header 610 to determine a format for payload header 630, and then parse payload header 630 to determine a format for the remainder of payload data 650.

Diagram 620 is a conceptual depiction of how data packet header 610 may be formatted. The numbers 0-15 in row 615 are intended to identify bit locations within data packet header 610 and are not intended to actually represent information contained within data packet header 610. Data packet header 610 includes version field 621, timestamp flag 622, reserved field 623, input category field 624, length field 625, and optional timestamp field 626.

In the example of FIG. 6, version field 621 is a 3-bit field that may indicate the version of a particular communications protocol being implemented by sink device 160. The value in version field 621 may inform source device 120 how to parse the remainder of data packet header 610 as well as how to parse payload data 650. In the example of FIG. 6, version field 621 is a three-bit field, which would enable a unique identifier for eight different versions. In other examples, more or fewer bits may be dedicated to version field 621.

In the example of FIG. 6, timestamp flag (T) 622 is a 1-bit field that indicates whether or not timestamp field 626 is present in data packet header 610. Timestamp field 626 is a 16-bit field containing a timestamp based on multimedia data that was generated by source device 120 and transmitted to sink device 160. The timestamp may, for example, be a sequential value assigned to frames of video by source device 120 prior to the frames being transmitted to sink device 160. Timestamp flag 622 may, for example, include a "1" to indicate timestamp field 626 is present and may include a "0" to indicate timestamp field 626 is not present. Upon parsing data packet header 610 and determining that timestamp field 626 is present, source device 120 can process the timestamp included in timestamp field 626. Upon parsing data packet header 610 and determining that timestamp field 626 is not present, source device 120 may begin parsing payload data 650 after parsing length field 625, as no timestamp field is present in data packet header 610.

If present, timestamp field 626 can include a timestamp to identify a frame of video data that was being displayed at wireless sink device 160 when the user input data of payload data 650 was obtained. The timestamp may, for example, have been added to the frame of video by source device 120 prior to source device 120 transmitting the frame of video to sink device 160. Accordingly, source device 120 may generate a frame of video and embed in the video data of the frame, as metadata for example, a timestamp. Source device 120 can transmit the video frame, with the timestamp, to sink device 160, and sink device 160 can display the frame of video. While the frame of video is being displayed by sink device 160, sink device 160 can receive a user command from a user. When sink device 160 generates a data packet to transfer the user command to source device 120, sink device 160 can include in timestamp field 626 the timestamp of the frame that was being displayed by sink device 160 when the user command was received.

Upon receiving data packet 600 with timestamp field 626 present in the header, wireless source device 120 may identify the frame of video being displayed at sink device 160 at the time the user input data of payload data 650 was obtained and process the user input data based on the content of the frame identified by the timestamp. For example, if the user input data is a touch command applied to a touch display or a click of a mouse pointer, source device 120 can determine the content of the frame being displayed at the time the user applied the touch command to the display or clicked the mouse. In some instances, the content of the frame may be needed to properly process the payload data. For example, a user input based on a user touch or a mouse click can be dependent on what was being shown on the display at the time of the touch or the click. The touch or click may, for example, correspond to an icon or menu option. In instances where the content of the display is changing, a timestamp present in timestamp field 626 can be used by source device 120 to match the touch or click to the correct icon or menu option.

Source device 120 may additionally or alternatively, compare the timestamp in timestamp field 626 to a timestamp being applied to a currently rendered frame of video. By comparing the timestamp of timestamp field 626 to a current timestamp, source device 120 can determine a round trip time. The round trip time generally corresponds to the amount of time that lapses from the point when a frame is transmitted by source device 120 to the point when a user input based on that frame is received back at source device 120 from sink device 160. The round trip time can provide source device 120 with an indication of system latency, and if the round trip time is greater than a threshold value, then source device 120 may ignore the user input data contained in payload data 650 under the assumption the input command was applied to an outdated display frame. When the round trip time is less than the threshold, source device 120 may process the user input data and adjust the audio/video content being transmitted in response to the user input data. Thresholds may be programmable, and different types of devices (or different source-sink combinations) may be configured to define different thresholds for round trip times that are acceptable.

In the example of FIG. 6, reserved field 623 is an 8-bit field that does not include information used by source 120 in parsing data packet header 610 and payload data 650. Future versions of a particular protocol (as identified in version field 621), however, may make use of reserved field 623, in which case source device 120 may use information in reserved field 623 for parsing data packet header 610 and/or for parsing payload data 650. Reserved field 623 in conjunction with version field 621 potentially provide capabilities for expanding and adding features to the data packet format without fundamentally altering the format and features already in use.

In the example of FIG. 6, input category field 624 is a 4-bit field to identify an input category for the user input data contained in payload data 650. Sink device 160 may categorize the user input data to determine an input category. Categorizing user input data may, for example, be based on the device from which a command is received or based on properties of the command itself. The value of input category field 624, possibly in conjunction with other information of data packet header 610, identifies to source device 120 how payload data 650 is formatted. Based on this formatting, source device 120 can parse payload data 650 to determine the user input that was received at sink device 160.

As input category 624, in the example of FIG. 6, is 4 bits, sixteen different input categories could possibly be identified. One such input category may be a generic input format to indicate that the user input data of payload data 650 is formatted using generic information elements defined in a protocol being executed by both source device 120 and sink device 160. A generic input format, as will be described in more detail below, may utilize generic information elements that allow for a user of sink device 160 to interact with source device 120 at the application level.

Another such input category may be a human interface device command (HIDC) format to indicate that the user input data of payload data 650 is formatted based on the type of input device used to receive the input data. Examples of types of devices include a keyboard, mouse, touch input device, joystick, camera, gesture capturing device (such as a camera-based input device), and remote control. Other types of input categories that might be identified in input category field 624 include a forwarding input format to indicate user data in payload data 650 did not originate at sink device 160, or an operating system specific format, and a voice command format to indicate payload data 650 includes a voice command.

Length field 625 may comprise a 16-bit field to indicate the length of data packet 600. The length may, for example, be indicated in units of 8-bits. As data packet 600 is parsed by source device 120 in words of 16 bits, data packet 600 can be padded up to an integer number of 16 bits. Based on the length contained in length field 625, source device 120 can identify the end of payload data 650 (i.e. the end of data packet 600) and the beginning of a new, subsequent data packet.

The various sizes of the fields provided in the example of FIG. 6 are merely intended to be explanatory, and it is intended that the fields may be implemented using different numbers of bits than what is shown in FIG. 6. Additionally, it is also contemplated that data packet header 610 may include fewer than all the fields discussed above or may use additional fields not discussed above. Indeed, the techniques of this disclosure may be flexible, in terms of the actual format used for the various data fields of the packets.

After parsing data packet header 610 to determine a formatting of payload data 650, source device 120 can parse payload data 650 to determine the user input command contained in payload data 650. Payload data 650 may have its own payload header (payload header 630) indicating the contents of payload data 650. In this manner, source device 120 may parse payload header 630 based on the parsing of data packet header 610, and then parse the remainder payload data 650 based on the parsing of the payload header 630.

If, for example, input category field 624 of data packet header 610 indicates a generic input is present in payload data 650, then payload data 650 can have a generic input format. Source device 120 can thus parse payload data 650 according to the generic input format. As part of the generic input format, payload data 650 can include a series of one or more input events with each input event having its own input event header. Table 1, below identifies the fields that may be included in an input header.

TABLE 1

| Field | Size (Octet) | Value |
|---|---|---|
| Generic IE ID | 1 | See Table 2 |
| Length | 2 | Length of the following fields in octets |
| Describe | Variable | The details of the user inputs. See Tables |

The generic input event (IE) identification (ID) field identifies the generic input event identification for identifying an input type. The generic IE ID field may, for example, be one octet in length and may include an identification selected from Table 2 below. If, as in this example, the generic IE ID field is 8 bits, then 256 different types of inputs (identified 0-255) may be identifiable, although not all 256 identifications necessarily need an associated input type. Some of the 256 may be reserved for future use with future versions of whatever protocol is being implemented by sink device 160 and source device 120. In Table 2, for instance, generic IE IDs 9-255 do not have associated input types but could be assigned input types in the future.

The length field in the input event header identifies the length of the describe field while the describe field includes the information elements that describe the user input. The formatting of the describe field may be dependent on the type of input identifies in the generic IE ID field. Thus, source device 120 may parse the contents of the describe field based on the input type identified in the generic IE ID field. Based on the length field of the input event header, source device 120 can determine the end of one input event in payload data 650 and the beginning of a new input event. As will be explained in more detail below, one user command may be described in payload data 650 as one or more input events.

Table 2 provides an example of input types, each with a corresponding generic IE ID that can be used for identifying the input type.

TABLE 2

| Generic IE ID | INPUT TYPE |
|---|---|
| 0 | Left Mouse Down/Touch Down |
| 1 | Left Mouse Up/Touch Up |
| 2 | Mouse Move/Touch Move |
| 3 | Key Down |
| 4 | Key Up |
| 5 | Zoom |
| 6 | Vertical Scroll |
| 7 | Horizontal Scroll |
| 8 | Rotate |
| 9-255 | Reserved |

The describe fields associated with each input type may have a different format. The describe fields of a LeftMouse Down/TouchDown event, a Left Mouse Up/Touch Up event, and Mouse Move/Touch Move event may, for example, include the information elements identified in Table 3 below, although other formats could also be used in other examples.

TABLE 3

| Field | Size (Octet) | Notes |
| --- | --- | --- |
| Number of pointers (N) | 1 | Number of pointers of a multi-touch motion event. When set to 1, it indicates a single-touch motion event. |
| For i = 1: N { | | |
| Pointer ID | 1 | The identification number of this pointer. The value lies in [0, 1, . . . ] |
| X-coordinate | 2 | X-coordinate for the event normalized with respect to a negotiated resolution of a video stream between sink device and source device. |
| Y-coordinate} | 2 | Y-coordinate for the event normalized with respect to a negotiated resolution of a video stream between sink device and source device. |

The number of pointers may identify the number of touches or mouse clicks associated with an input event. Each pointer may have a unique pointer ID. If, for example, a multi-touch event includes a three finger touch, then the input event might have three pointers, each with a unique pointer ID. Each pointer (i.e. each finger touch) may have a corresponding x-coordinate and y-coordinate corresponding to where the touch occurred.

A single user command may be described as a series of input events. For example, if a three-finger swipe is a command to close an application, the three finger swipe may be described in payload data 650 as a touch down event with three pointers, a touch move event with three pointers, and a touch up event with three pointers. The three pointers of the touch down event may have the same pointer IDs as the three pointers of the touch move event and touch up event. Source device 120 can interpret the combination of those three input events as a three finger swipe.

The describe fields of a Key Down event or a Key Up event may, for example, include the information elements identified in Table 4 below.

TABLE 4

| Field | Size (Octet) | Notes |
| --- | --- | --- |
| Reserved | 1 | Reserved |
| Key code 1 (ASCII) | 2 | The key code of the first key down or up event. The basic/extended ASCII code uses the lower one byte. The higher one byte is reserved for future ASCII compatible key code |
| Key code 2 (ASCII) | 2 | The key code for the second key down or up event. The basic/extended ASCII code uses the lower one byte. The higher one byte is reserved for future ASCII compatible key code. |

The describe field of a zoom event may, for example, include the information elements identified in Table 5 below.

TABLE 5

| Field | Size (Octet) | Notes |
| --- | --- | --- |
| X | 2 | The reference X-coordinate for the zoom operation normalized with respect to with respect to a negotiated resolution of a video stream between sink device and source device. |
| Y | 2 | The reference Y-coordinate for the zoom operation normalized with respect to a negotiated resolution of a video stream between sink device and source device. |
| Integer times to zoom | 1 | The unsigned integer portion of the number of times to zoom |
| Fraction times to zoom | 1 | The fraction portion of the number of times to zoom |

The describe field of a horizontal scroll event or a vertical scroll event may, for example, include the information elements identified in Table 6 below.

TABLE 6

| Field | Size (Octet) | Notes |
| --- | --- | --- |
| Amount to scroll | 2 | Number of pixels to scroll normalized with respect to a negotiated resolution of a video stream between sink device and source device. A negative number can indicate to scroll right, and a positive number can indicate to scroll left |

The above examples have shown some exemplary ways that the payload data might be formatted for a generic input category. If input category field 624 of data packet header 610 indicates a different input category, such as a forwarded user input, then payload data 650 can have a different input format. With a forwarded user input, sink device 160 may receive the user input data from a third party device and forward the input to source device 120 without interpreting the user input data. Source device 120 can thus parse payload data 650 according to the forwarded user input format. For example, payload header 630 of payload data 650 may include a field to identify the third party device from which the user input was obtained. The field may, for example, include an internet protocol (IP) address of the third party device, MAC address, a domain name, or some other such identifier. Source device 120 can parse the remainder of the payload data based on the identifier of the third party device.

Sink device 160 can negotiate capabilities with the third party device via a series of messages. Sink device 160 can then transmit a unique identifier of the third party device to source device 120 as part of establishing a communication session with source device 120 as part of a capability negotiation process. Alternatively, sink device 160 may transmit information describing the third-party device to source device 120, and based on the information, source device 120 can determine a unique identifier for the third-party device. The information describing the third party device may, for example, include information to identify the third-party device and/or information to identify capabilities of the third-party device. Regardless of whether the unique identifiers is determined by source device 120 or sink device 160, when sink device 160 transmits data packets with user input obtained from the third part device, sink device 160 can include the unique identifier in the data packet, in a payload header for example, so that source device 120 can identify the origin of the user input.

If input category field 624 of data packet header 610 indicates yet a different input category, such as a voice command, then payload data 650 can have yet a different input format. For a voice command, payload data 650 may include coded audio. The codec for encoding and decoding the audio of the voice command can be negotiated between source device 120 and sink device 160 via a series of messages. For transmitting a voice command, timestamp field 626 may include a speech-sampling time value. In such an instance, timestamp flag 622 may be set to indicate a timestamp is present, but instead of a timestamp as described above, timestamp field 626 may include a speech-sampling time value for the encoded audio of payload data 650.

In some examples, a voice command may be transmitted as a generic command as described above, in which case input category field 624 may be set to identify the generic command format, and one of the reserved generic IE IDs may be assigned to voice commands. If the voice command is transmitted as a generic command, then a speech sampling rate may be present in timestamp field 626 of data packet header 610 or may be present in payload data 650.

For captured voice command data, the voice data can be encapsulated in multiple ways. For example, the voice command data can be encapsulated using RTP which can provide the payload type to identify the codec and timestamp, with the timestamp being used to identify the sampling rate. The RTP data can be encapsulated using the generic user input format described above, either with or without the optional timestamp. Sink device 160 can transmit the generic input data that carries the voice command data to source device 120 using TPC/IP.

As discussed previously, when coordinates are included as part of a data packet such as data packet 600, in payload data 650 for example, the coordinates may correspond to coordinates scaled based on a negotiated resolution, display window coordinates, normalized coordinates, or coordinates associated with a sink display. In some instances, additional information, may be included, either in the data packet or transmitted separately, for use by a source device to normalize coordinates received in the data packet.

Regardless of the input category for a particular data packet the data packet header may be an application layer packet header, and the data packet may be transmitted over TCP/IP. TCP/IP can enable sink device 160 and source device 120 to perform retransmission techniques in the event of packet loss. The data packet may be sent from sink device 160 to source device 120 to control audio data or video data of source device 120 or for other purposes such as to control an application running on source device 120.

Figure 7B:
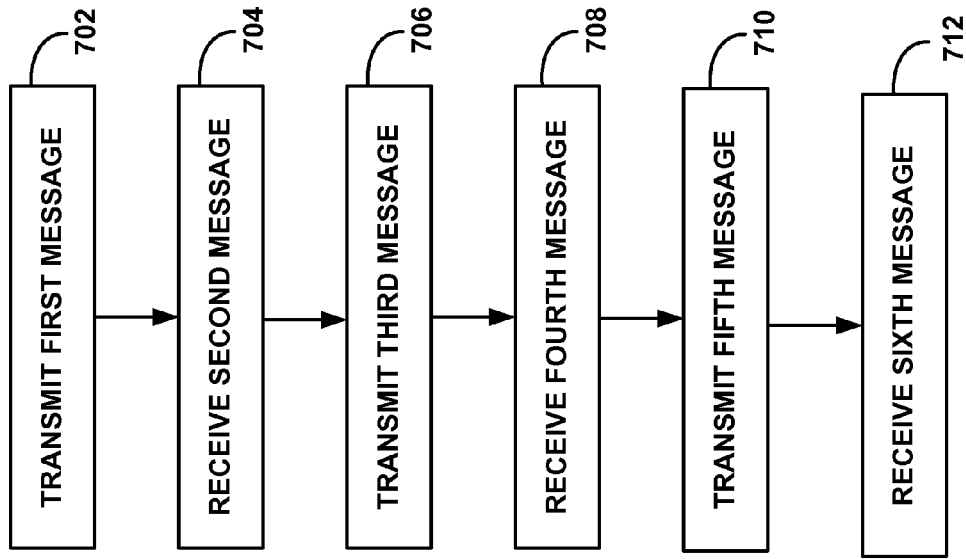
FIGS. 7A and 7B are flow charts illustrating techniques of this disclosure that may be used for capability negotiation between a source device and a sink device.
Figure 7A:
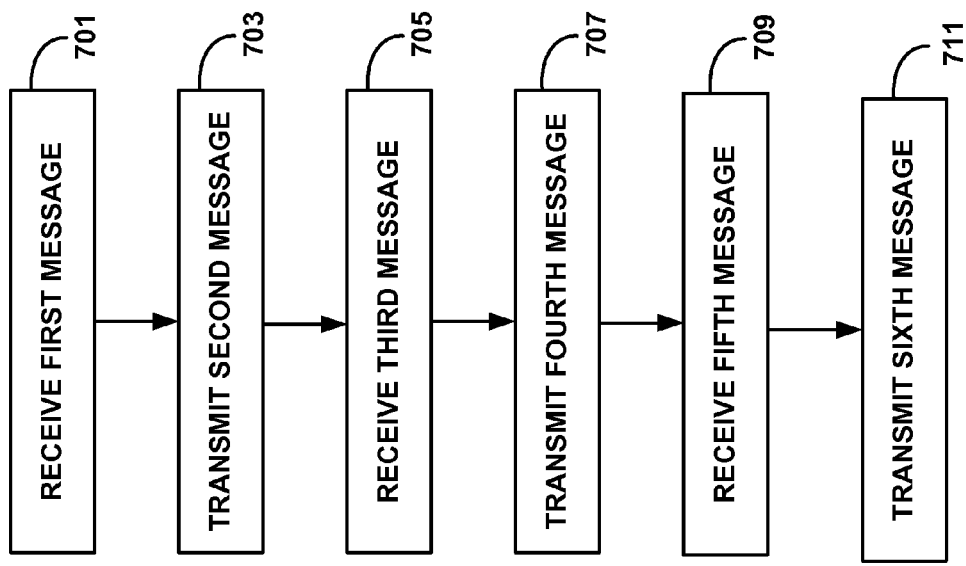

FIG. 7A is a flowchart of an example method of negotiating capabilities between a sink device and a source device. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in one or more of the flow charts described herein.

The method of FIG. 7A includes sink device 160 receiving from the source device 120 a first message (701). The message may, for example, comprise a get parameter request. In response to the first message, sink device 160 may send a second message to source device 120 (703). The second message may, for example, comprise a get parameter response that identifies a first list of supported input categories and a plurality of first lists of supported types, wherein each of the supported input categories of the first list of supported input categories has an associated first list of supported types. The supported input categories may, for example, correspond to the same categories used for input category field 624 of FIG. 6. Table 2 above represents one example of supported types for a particular input category (generic inputs in this example). Sink device 160 may receive from source device 120, a third message (705). The third message may, for example, comprise a set parameter request, wherein the set parameter request identifies a port for communication, a second list of supported input categories, and a plurality of second lists of supported types, with each of the supported input categories of the second list of supported input categories having an associated second list of supported types, and each of the supported types of the second lists including a subset of the types of the first lists. Sink device 160 can transmit to source device 120 a fourth message (707). The fourth message may, for example, comprise a set parameter response to confirm that the types of the second lists have been enabled. Sink device 160 can receive from source device 120 a fifth message (709). The fifth message may, for example, comprise a second set parameter request that indicates that a communication channel between the source device 120 and sink device 160 has been enabled. The communication channel may, for example, comprise a user input back channel (UIBC). Sink device 160 can transmit to source device 120 a sixth message (711). The sixth message may, for example, comprise a second set parameter response that confirms receipt of the second set parameter request by sink device 160.

FIG. 7B is a flowchart of an example method of negotiating capabilities between a sink device and a source device. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 7B includes source device 120 transmitting to sink device 160 a first message (702). The first message may, for example, comprise a get parameter request. Source device 120 can receive a second message from sink device 160 (704). The second message may, for example, comprise a get parameter response that identifies a first list of supported input categories and a plurality of first lists of supported types, wherein each of the supported input categories of the first list of supported input categories has an associated first list of supported types. Source device 120 may transmit to sink device 160, a third message (706). The third message may, for example, comprise a set parameter request that identifies a port for communication, a second list of supported input categories, and a plurality of second lists of supported types, with each of the supported input categories of the second list of supported input categories having an associated second list of supported types, and each of the supported types of the second lists including a subset of the types of the first lists. Source device 120 can receive from sink device 160 a fourth message (708). The fourth message may, for example, comprise a set parameter response to confirm that the types of the second lists have been enabled. Source device 120 can transmit to sink device 160 a fifth message (710). The fifth message may, for example, comprise a second set parameter request that indicates that a communication channel between the source device 120 and sink device 160 has been enabled. The communication channel may, for example, comprise a user input back channel (UIBC). Source device 120 can receive from sink device 160 a sixth message (712). The sixth message may, for example, comprise a second set parameter response that confirms receipt of the second set parameter request by sink device 160.

FIG. 8A is a flow chart of an example method of transmitting user input data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 8A includes obtaining user input data at a wireless sink device, such as wireless dashboard sink device 160 (801). The user input data may be obtained through a user input component of dashboard sink device 160 such as, for example, user input interface 376 shown in relation to wireless sink device 360. Additionally, sink device 160 may categorize the user input data as, for example, generic, forwarded, or operating system specific. Sink device 160 may then generate a data packet header based on the user input data (803). The data packet header can be an application layer packet header. The data packet header may comprise, among other fields, a field to identify an input category corresponding to the user input data. The input category may comprise, for example, a generic input format or a human interface device command. Sink device 160 may further generate a data packet (805), where the data packet comprises the generated data packet header and payload data. In one example, payload data may include received user input data and may identify one or more user commands Sink device 160 may then transmit the generated data packet (807) to the wireless source device (e.g., source device 120 of FIG. 1A or 220 of FIG. 2). Sink device 160 may comprise components that allow transfer of data packets, including transport unit 333 and wireless modem 334 as shown in FIG. 3, for example. Sink device 160 may transfer the data packet over TCP/IP.

FIG. 8B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 8B includes receiving a data packet (802), where the data packet may comprise, among other things, a data packet header and payload data. Payload data may include, for example, user input data. Source device 120 may comprise communications components that allow transfer of data packets, including transport unit 233 and wireless modem 234, for example as shown in reference to FIG. 2. Source device 120 may then parse the data packet header (804) included in the data packet, to determine an input category associated with the user input data contained in the payload data. Source device 120 may process the payload data based on the determined input category (806). The data packets described with reference to FIGS. 8A and 8B may generally take the form of the data packets described with reference to FIG. 6 and may be used to control audio/video data and applications at a source device.

Figure 9B:
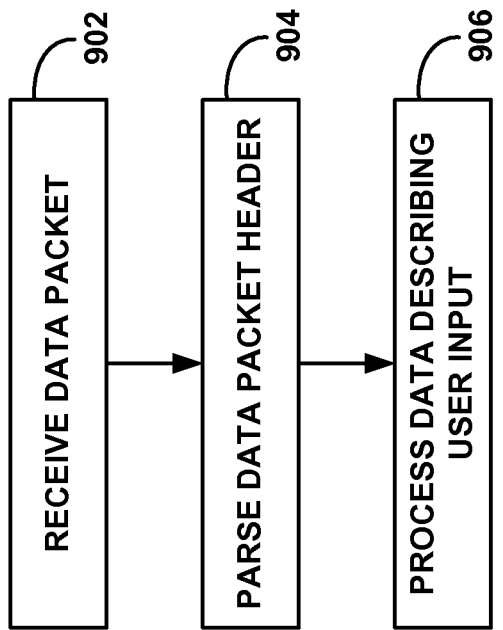
FIGS. 9A and 9B are flow charts illustrating techniques of this disclosure that may be used for transmitting and receiving data packets with user input data.
Figure 9A:
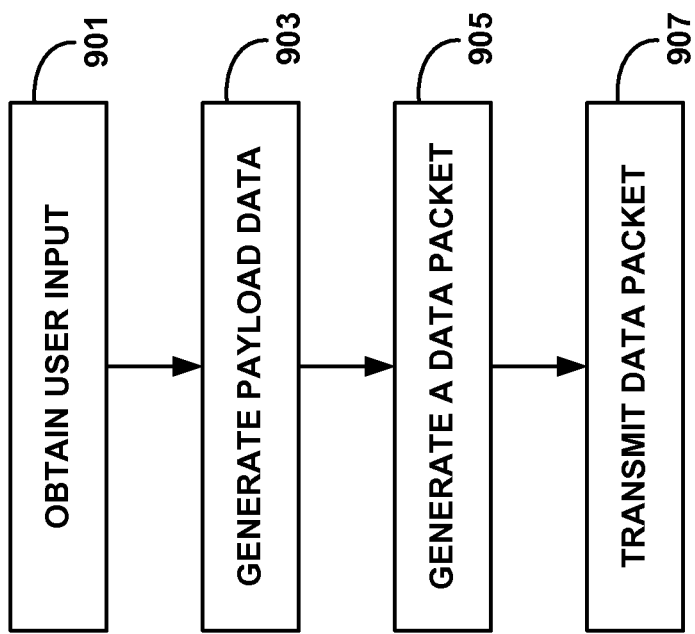

FIG. 9A is a flow chart of an example method of transmitting user input data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 9A includes obtaining user input data at a wireless sink device such as wireless sink device 160 (901). The user input data may be obtained through a user input component of wireless sink device 160 such as, for example, user input interface 376 shown with reference to FIG. 3. Sink device 160 may then generate payload data (903), where the payload data may describe the user input data. In one example, payload data may include received user input data and may identify one or more user commands Sink device 160 may further generate a data packet (905), where the data packet comprises a data packet header and the generated payload data. Sink device 160 may then transmit the generated data packet (907) to the wireless source device (e.g., source device 120 of FIG. 1A or 220 of FIG. 2). Sink device 160 may comprise components that allow transfer of data packets, such as transport unit 333 and wireless modem 334, for example. The data packet can be transmitted to a wireless source device over TCP/IP.

FIG. 9B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 9B includes receiving a data packet from sink device 360 (902), where the data packet may comprise, among other things, a data packet header and payload data. In one example, payload data may comprise, for example, data describing details of a user input such as input type value. Source device 120 may comprise communications components that allow transfer of data packets, including transport unit 233 and wireless modem 234, for example as shown with reference to FIG. 2. Source device 120 may then parse the data packet (904) to determine an input type value in an input type field in the payload data. Source device 120 may process the data describing details of the user input based on the determined input type value (906). The data packets described with reference to FIGS. 9A and 9B may generally take the form of the data packets described with reference to FIG. 6.

Figure 10B:
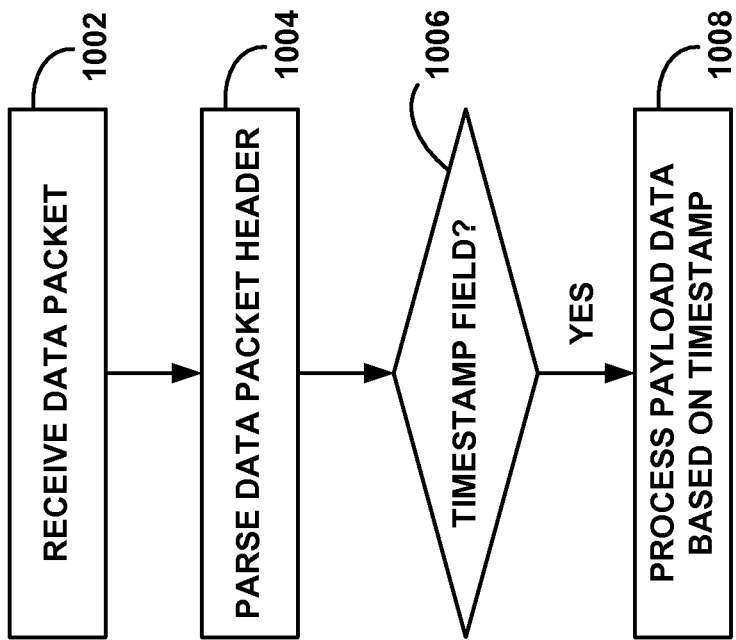
FIGS. 10A and 10B are flow charts illustrating techniques of this disclosure that may be used for transmitting and receiving data packets with timestamp information and user input data.
Figure 10A:
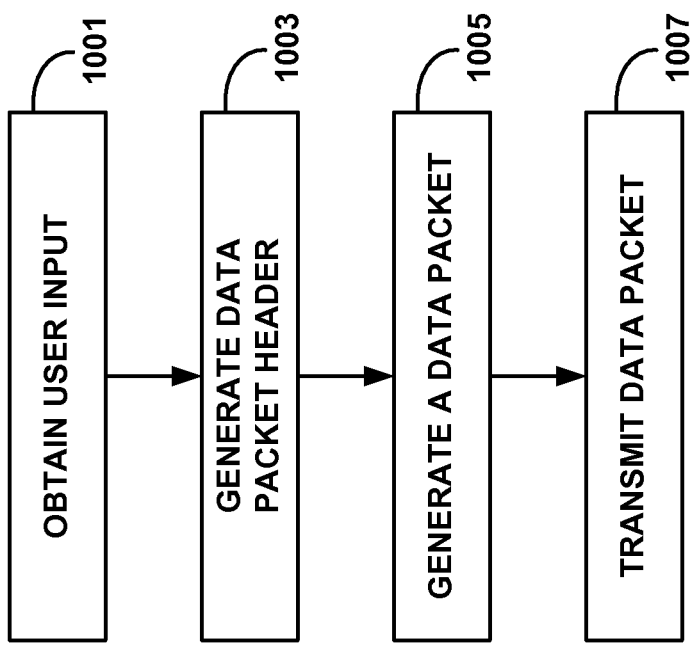

FIG. 10A is a flow chart of an example method of transmitting user input data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 10A includes obtaining user input data at a wireless sink device, such as wireless sink device 160 (1001). The user input data may be obtained through a user input component of wireless sink device 160 such as, for example, user input interface 376 as shown with reference to FIG. 3. Sink device 160 may then generate a data packet header based on the user input (1003). The data packet header may comprise, among other fields, a timestamp flag (e.g., a 1-bit field) to indicate if a timestamp field is present in the data packet header. The timestamp flag may, for example, include a "1" to indicate timestamp field is present and may include a "0" to indicate timestamp field is not present. The timestamp field may be, for example, a 16-bit field containing a timestamp generated by source device 120 and added to video data prior to transmission. Sink device 160 may further generate a data packet (1005), where the data packet comprises the generated data packet header and payload data. In one example, payload data may include received user input data and may identify one or more user commands Sink device 160 may then transmit the generated data packet (1007) to the wireless source device (e.g., source device 120 of FIG. 1A or 220 of FIG. 2). Sink device 160 may comprise components that allow transfer of data packets, including transport unit 333 and wireless modem 334, for example as shown in reference to FIG. 3. The data packet can be transmitted to a wireless source device over TCP/IP.

FIG. 10B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 10B includes receiving a data packet from wireless sink device 160 (1002), where the data packet may comprise, among other things, a data packet header and payload data. Payload data may include, for example, user input data. Source device 120 may comprise communications components that allow transfer of data packets, including transport unit 233 and wireless modem 234, for example as shown in reference to FIG. 2. Source device 120 may then parse the data packet header (1004) included in the data packet. Source device 120 may determine if a timestamp field is present in the data packet header (1006). In one example, Source device 120 may make the determination based on a timestamp flag value included in the data packet header. If the data packet header includes a timestamp field, Source device 120 may process the payload data based on a timestamp that is in the timestamp field (1008). The data packets described with reference to FIGS. 10A and 10B may generally take the form of the data packets described with reference to FIG. 6 and may be used to control audio/video data at a source device.

Figure 11B:
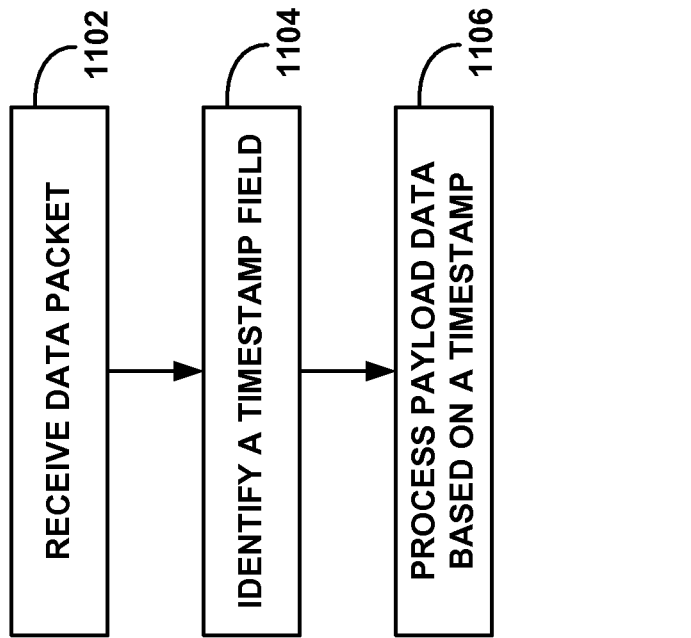
FIGS. 11A and 11B are flow charts illustrating techniques of this disclosure that may be used for transmitting and receiving data packets with timestamp information and user input data.
Figure 11A:
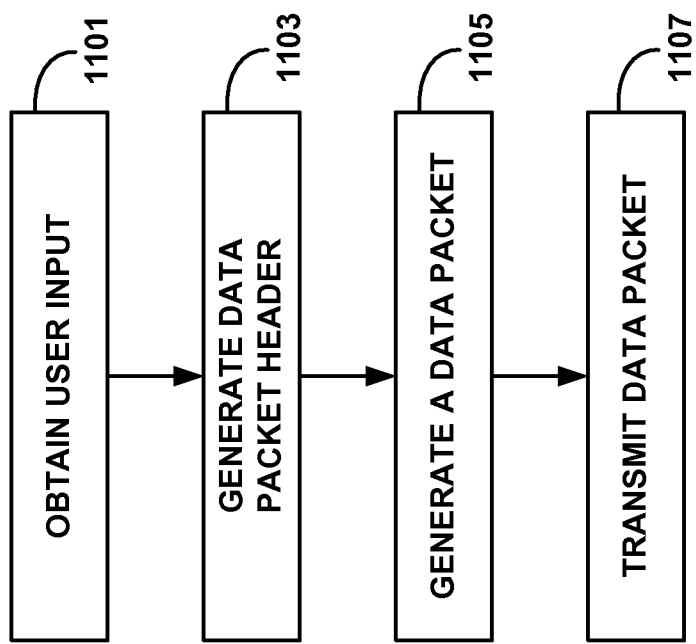

FIG. 11A is a flow chart of an example method of transmitting user input data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 11A includes obtaining user input data at a wireless sink device, such as wireless sink device 160 (1101). The user input data may be obtained through a user input component of wireless sink device 160 such as, for example, user input interface 376 shown in reference to FIG. 3. Sink device 160 may then generate a data packet header based on the user input (1103). The data packet header may comprise, among other fields, a timestamp field. The timestamp field may comprise, for example, a 16-bit field containing a timestamp based on multimedia data that was generated by wireless source device 120 and transmitted to wireless sink device 160. The timestamp may have been added to the frame of video data by wireless source device 120 prior to being transmitted to the wireless sink device. The timestamp field may, for example, identify a timestamp associated with a frame of video data being displayed at wireless sink device 160 at the time the user input data was captured. Sink device 160 may further generate a data packet (1105), where the data packet comprises the generated data packet header and payload data. In one example, payload data may include received user input data and may identify one or more user commands. Sink device 160 may then transmit the generated data packet (1107) to the wireless source device (e.g., source device 120 of FIG. 1A or 220 of FIG. 2). Sink device 160 may comprise components that allow transfer of data packets, including transport unit 333 and wireless modem 334, for example as shown in reference to FIG. 3. The data packet can be transmitted to a wireless source device over TCP/IP.

FIG. 11B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 11B includes receiving a data packet from a wireless sink device, such as wireless sink device 160 (1102), where the data packet may comprise, among other things, a data packet header and payload data. Payload data may include, for example, user input data. Source device 120 may comprise communications components that allow transfer of data packets, including transport unit 233 and wireless modem 234, for example as shown in reference to FIG. 2. Source device 120 may then identify a timestamp field in the data packet header (1104). Source device 120 may process the payload data based on a timestamp that is in the timestamp field (1106). As part of processing the payload data, based on the timestamp, source device 120 may identify a frame of video data being displayed at the wireless sink device at the time the user input data was obtained and interpret the payload data based on content of the frame. As part of processing the payload data based on the timestamp, source device 120 may compare the timestamp to a current timestamp for a current frame of video being transmitted by source device 120 and may perform a user input command described in the payload data in response to a time difference between the timestamp and the current timestamp being less than a threshold value, or not perform a user input command described in the payload data in response to a time difference between the timestamp and the current timestamp being greater than a threshold value. The data packets described with reference to FIGS. 11A and 11B may generally take the form of the data packets described with reference to FIG. 6 and may be used to control audio/video data at a source device.

FIG. 12A is a flow chart of an example method of transmitting user input data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 12A includes obtaining user input data at a wireless sink device, such as wireless sink device 160 (1201). In one example, the user input data may be voice command data, which may be obtained through a user input component of wireless sink device 160 such as, for example, a voice command recognition module included in user input interface 376 in FIG. 3. In examples according to this disclosure, a user may wish to call someone in a contacts application on source device 120 while driving in the user's car and may use a voice command received at dashboard sink device 160 as a safer means of retrieving a contact number and initiating the call. Sink device 160 may generate a data packet header based on the user input (1203). Sink device 160 may also generate payload data (1205), where the payload data may comprise the voice command data. In one example, payload data may also include received user input data and may identify one or more user commands. Sink device 160 may further generate a data packet (1207), where the data packet comprises the generated data packet header and payload data. Sink device 160 may then transmit the generated data packet (1209) to the wireless source device (e.g., source device 120 of FIG. 1A or 220 of FIG. 2). Sink device 160 may comprise components that allow transfer of data packets, including transport unit 333 and wireless modem 334, for example as shown in reference to FIG. 3. The data packet can be transmitted to a wireless source device over TCP/IP.

FIG. 12B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 12B includes receiving a data packet (1202), where the data packet may comprise, among other things, a data packet header and payload data. Payload data may include, for example, user input data such as voice command data. Source device 120 may comprise communications components that allow transfer of data packets, including transport unit 233 and wireless modem 234, for example as shown in reference to FIG. 2. Source device 120 may then parse the payload data (1204) included in the data packet, to determine if the payload data comprises voice command data. The data packets described with reference to FIGS. 12A and 12B may generally take the form of the data packets described with reference to FIG. 6 and may be used to control audio/video data at a source device.

Figures 13A, 13B:
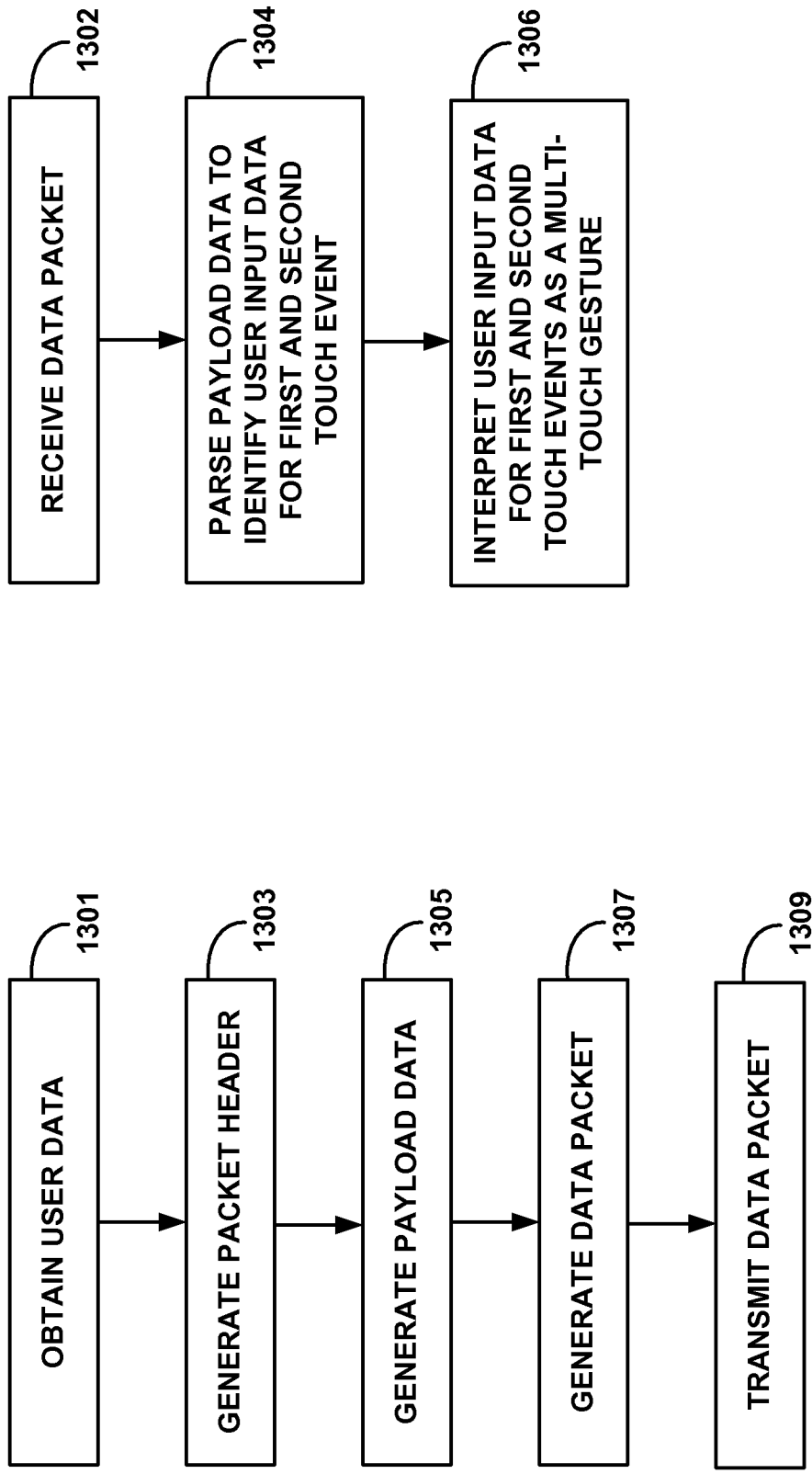
FIGS. 13A and 13B are flow charts illustrating techniques of this disclosure that may be used for transmitting and receiving data packets with multi-touch user input commands.

FIG. 13A is a flow chart of an example method of transmitting user input data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 13A includes obtaining user input data at a wireless sink device, such as wireless sink device 160 (1301). In one example, the user input data may be a multi-touch gesture, which may be obtained through a user input component of wireless sink device 160 such as, for example, UI 167 or user input interface 376 of FIG. 3. In one example, the multi-touch gesture may comprise a first touch input and a second touch input. Sink device 160 may generate a data packet header based on the user input (1303). Sink device 160 may also generate payload data (1305), where the payload data may associate user input data for the first touch input event with a first pointer identification and user input for the second touch input event with a second pointer identification. Sink device 160 may further generate a data packet (1307), where the data packet comprises the generated data packet header and payload data. Sink device 160 may then transmit the generated data packet (1309) to the wireless source device (e.g., source device 120 of FIG. 1A or 220 of FIG. 2). Sink device 160 may comprise components that allow transfer of data packets, including transport unit 333 and wireless modem 334, for example as shown in reference to FIG. 3. The data packet can be transmitted to a wireless source device over TCP/IP.

FIG. 13B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 13B includes receiving a data packet (1302), where the data packet may comprise, among other things, a data packet header and payload data. Payload data may include, for example, user input data such as multi-touch gesture. Source device 120 may comprise communications components that allow transfer of data packets, including transport unit 233 and wireless modem 234, for example as shown in FIG. 2. Source device 120 may then parse the payload data (1304) included in the data packet, to identify user input data included in the payload data. In one example, the identified data may include user input data for a first touch input event with a first pointer identification and user input data for a second touch input event with a second pointer identification. Source device 120 may then interpret the user input data for the first touch input event and the user input data for the second touch input event as a multi-touch gesture (1306). The data packets described with reference to FIGS. 13A and 13B may generally take the form of the data packets described with reference to FIG. 6 and may be used to control audio/video data at a source device.

Figure 14B:
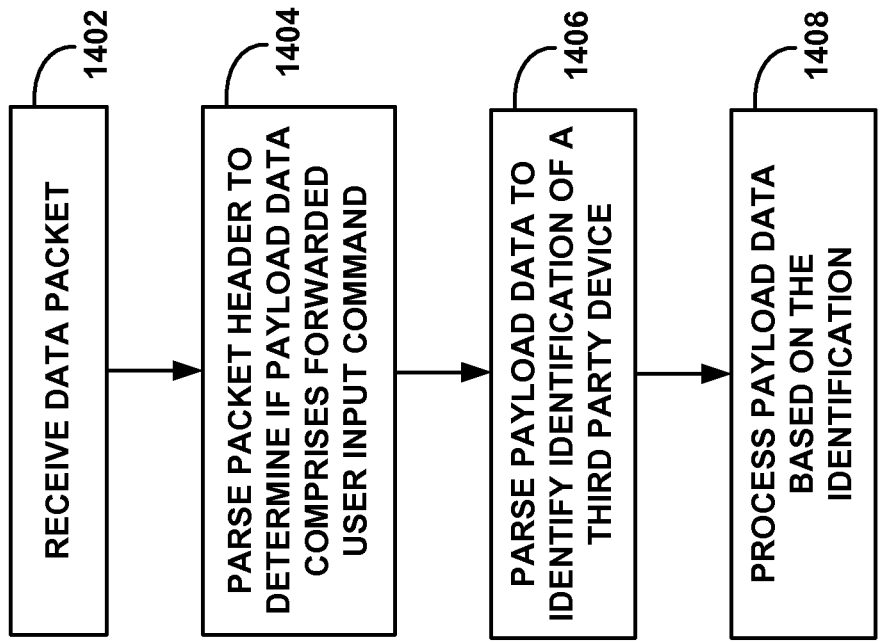
FIGS. 14A and 14B are flow charts illustrating techniques of this disclosure that may be used for transmitting and receiving data packets with user input data forwarded form a third party device.
Figure 14A:
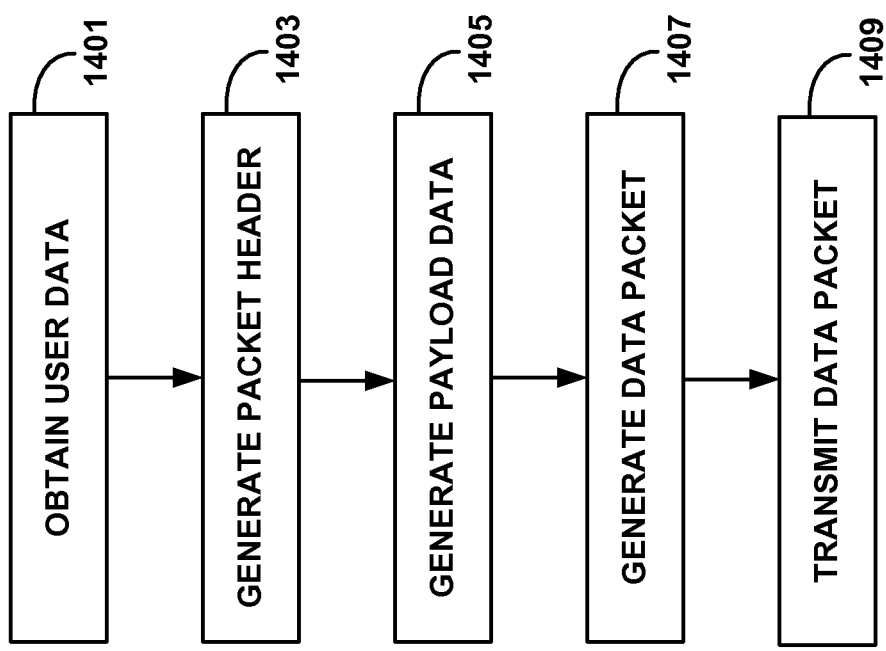

FIG. 14A is a flow chart of an example method of transmitting user input data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 14A includes obtaining user input data at wireless sink device 360 from an external device (1401). In one example, the external device may be a third party device connected to the sink device. Sink device 160 may generate a data packet header based on the user input (1403). In one example, the data packet header may identify the user input data as forwarded user input data. Sink device 160 may also generate payload data (1405), where the payload data may comprise the user input data. Sink device 160 may further generate a data packet (1407), where the data packet may comprise the generated data packet header and payload data. Sink device 160 may then transmit the generated data packet (1409) to the wireless source device (e.g., source device 120 of FIG. 1A or 220 of FIG. 2). Sink device 160 may comprise components that allow transfer of data packets, including transport unit 333 and wireless modem 334, for example as shown with reference to FIG. 3. The data packet can be transmitted to a wireless source device over TCP/IP.

FIG. 14B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 14B includes receiving a data packet (1402), where the data packet may comprise, among other things, a data packet header and payload data. Payload data may include, for example, user input data such as a forwarded user input command indicating user input data was forwarded from a third party device. Source device 120 may comprise communications components that allow transfer of data packets, including transport unit 233 and wireless modem 234, for example as shown in reference to FIG. 2. Source device 120 may then parse the data packet header and may determine that the payload data comprises a forwarded user input command (1404). Source device 120 may then parse the payload data (1406) included in the data packet, to identify an identification associated with the third party device corresponding to the forwarded user input command Source device 120 may then process the payload data based on the identified identification of the third party device (1408). The data packets described with reference to FIGS. 14A and 14B may generally take the form of the data packets described with reference to FIG. 6 and may be used to control audio/video data at a source device.

FIG. 15A is a flow chart of an example method of transmitting user data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 15A includes obtaining user input data at the wireless sink device (1501). The user input data can have associated coordinate data. The associated coordinate data may, for example, correspond to a location of a mouse click event or a location of a touch event. Sink device 160 may then normalize the associated coordinate data to generate normalized coordinate data (1503). Sink device 160 may then generate a data packet that includes the normalized coordinate data (1505). Normalizing the coordinate data can include scaling the associated coordinate data based on a ratio of the resolution of a display window and a resolution of the display of the source, such as display 22 of source device 120. The resolution of the display window can be determined by sink device 160, and the resolution of the display of the source device can be received from source device 120. Sink device 160 may then transmit the data packet with the normalized coordinates to wireless source device 120 (1507). As part of the method of FIG. 15A, sink device 160 may also determine if the associated coordinate data is within a display window for content being received from the wireless source device, and for example, process a user input locally if the associated coordinate data is outside the display window, or otherwise normalize the coordinates as described if the input is within the display window.

FIG. 15B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 15B includes receiving a data packet at the wireless source device, where the data packet comprises user input data with associated coordinate data (1502). The associated coordinate data may, for example, correspond to a location of a mouse click event or a location of a touch event at a sink device. Source device 120 may then normalize the associated coordinate data to generate normalized coordinate data (1504). Source device 120 can normalize the coordinate data by scaling the associated coordinate data based on a ratio of the resolution of the display window and a resolution of the display of the source. Source device 120 can determine the resolution of the display of the source device and can receive the resolution of the display window from the wireless sink device. Source device may then process the data packet based on the normalized coordinate data (1506). The data packets described with reference to FIGS. 15A and 15B may generally take the form of the data packets described with reference to FIG. 6 and may be used to control audio/video data at a source device.

Figure 16:
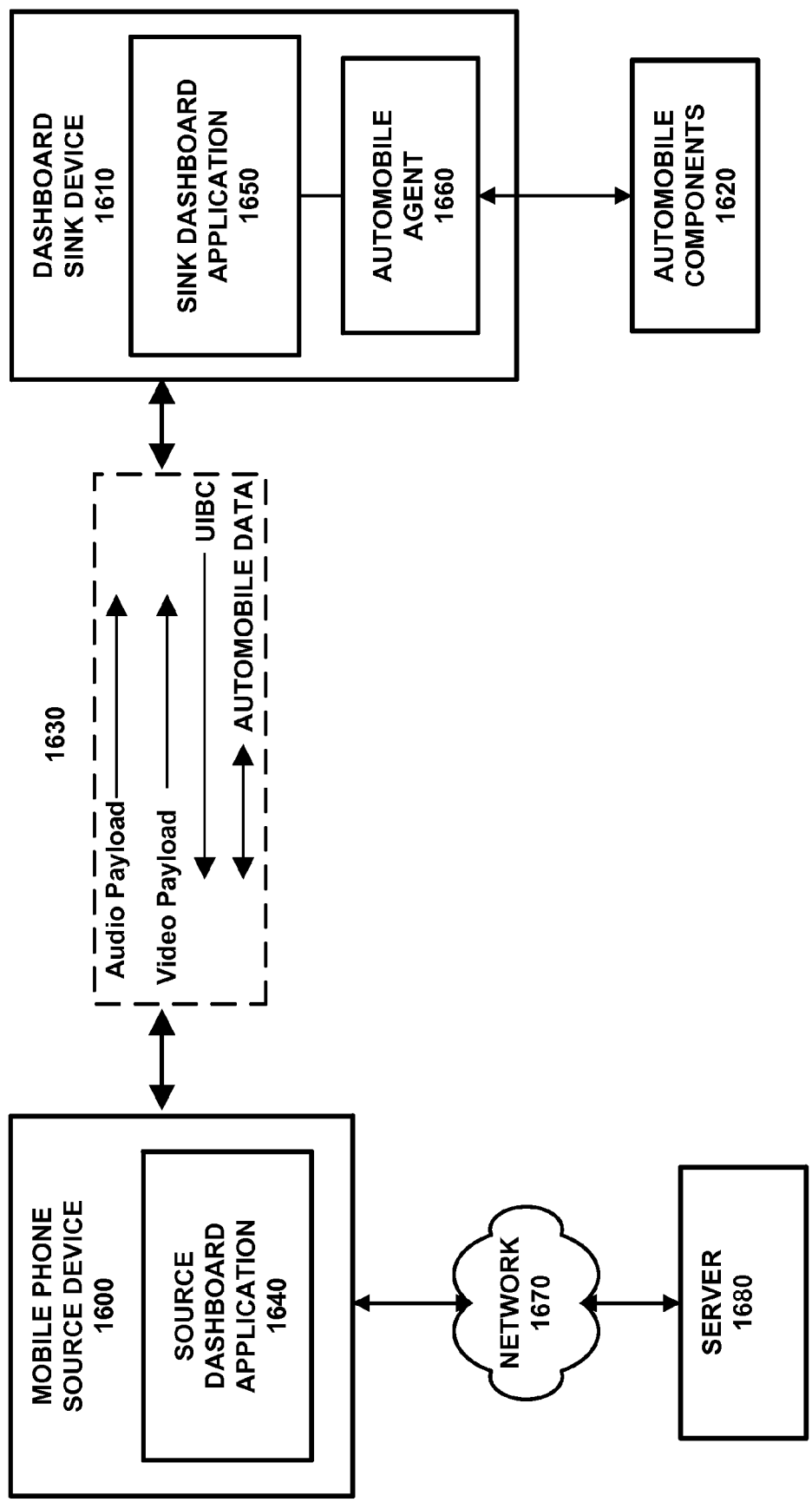
FIG. 16 is a block diagram illustrating an example of a source/sink system that may implement techniques of this disclosure.

FIG. 16 is a block diagram illustrating an exemplary source/sink system according to this disclosure including mobile phone source device 1600 and dashboard sink device 1610. Mobile phone source 1600 and dashboard sink 1610 may be configured and function in a manner similar to the source and sink devices described in detail above with reference to FIGS. 1A-6. In the example of FIG. 16, phone source 1600 and dashboard sink 1610 are configured to communicate over communications channel 1630, including communicating audio and video payload data from phone source 1600 to dashboard sink 1610 and user input data based on user inputs received at dashboard sink 1610 from dashboard sink 1610 to phone source 1600 via UIBC. Mobile phone source 1600 includes source dashboard application 1640, which may be an application configured to enable communications between phone source 1600 and dashboard sink 1610 and which has been authenticated by the manufacturer of the automobile and/or dashboard for communication with the dashboard sink 1610. Dashboard sink 1610 includes sink dashboard application 1650 for communication sessions between sink 1610 and various wireless source devices, including, e.g., phone source device 1600. Dashboard sink 1610 also includes automobile agent 1660 for interfacing with other devices and systems of the automobile in which dashboard sink 1610 is arranged, which is generally indicated in FIG. 16 as automobile components 1620.

As also illustrated in the example of FIG. 16, mobile phone source 1600 is configured to communicate with network 1670. Network 1670 may include one or more terrestrial and/or satellite networks interconnected to provide a means of communicatively connecting mobile phone source 1600 to various remote devices and systems, e.g. data repositories and servers including remote server 1680. For example, network 1670 may be a private or public local area network (LAN) or Wide Area Network (WANs). Network 1670 may include both wired and wireless communications according to one or more standards and/or via one or more transport mediums. For example, network 1670 may include wireless communications according to one of the 802.11 or Bluetooth specification sets, or another standard or proprietary wireless communication protocol. Network 1670 may also include communications over a terrestrial cellular network, including, e.g. a GSM (Global System for Mobile Communications), CDMA (Code Division Multiple Access), EDGE (Enhanced Data for Global Evolution) network. Data transmitted over network 1670, e.g., from mobile phone source 1600 may be formatted in accordance with a variety of different communications protocols. For example, all or a portion of network 1670 may be a packet-based, Internet Protocol (IP) network that communicates data from phone source 1600 in Transmission Control Protocol/Internet Protocol (TCP/IP) packets.

In the example of FIG. 16, network 1670 includes one or more interconnected networks that provide a means of communicatively connecting mobile phone source 1600 to remote server 1680. Server 1680 could be any of a number of different types of computing devices configured to communicate with mobile phone source 1600 for a number of reasons. In one example, mobile phone source 1600 communicates data indicative of the operational state of the automobile in which dashboard sink 1610 is arranged to remote server 1680. Remote server 1680 could be owned/operated by a manufacturer of the automobile or the dashboard. In one example, the operational state data could be communicated to remote server 1680 for processing, including, e.g., diagnosing service or maintenance issues with the automobile that are related to and/or indicated by the operational state data. In another example, mobile phone source and remote server 1680 could communicate for other reasons, including, e.g., remote server 1680 providing software updates for source dashboard application 1640 to mobile phone source 1600.

Figure 17:
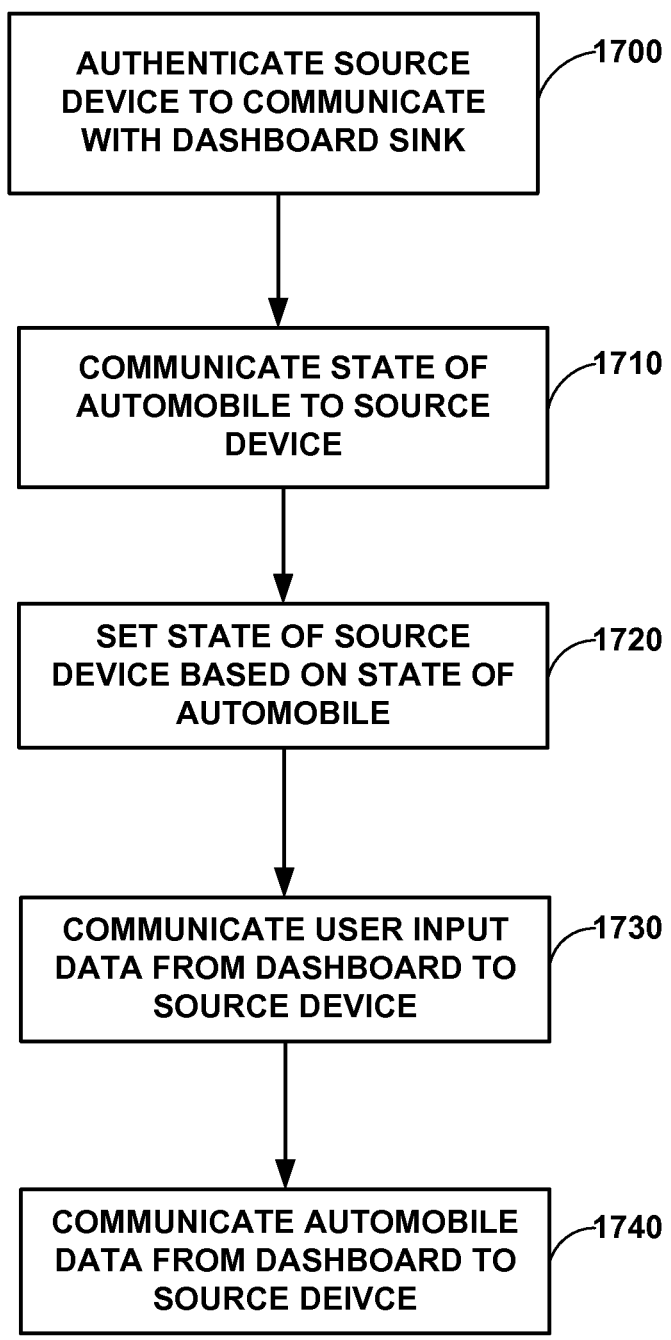
FIG. 17 is a flow chart illustrating various techniques related to communications between a source device and an automobile dashboard sink device.

Example methods and functions according to this disclosure are illustrated in FIG. 17, which is a flow chart illustrating various techniques related to communications between a source device and an automobile dashboard sink device. The functions illustrated in FIG. 17 are described below with reference to the system of FIG. 16 including phone source 1600 and dashboard sink 1610. However, in other examples, the functions illustrated in the various functions of FIG. 17 may be carried out by other systems and devices, including, e.g., wireless source devices other than a mobile phone communicating with dashboard sink device 1610 arranged in an automobile. Additionally, although FIG. 17 illustrates one method including a number of discrete functions in combination. In other examples, one or more of the functions in the method of FIG. 17 may be executed separately and independent of one another. For example, the function of authenticating a wireless source device for communications with a dashboard sink device in an automobile (1700) may be carried out separately and independent of communicating user input data from the dashboard sink to the source device (1730).

The functions illustrated in the example method of FIG. 17 are framed as relating to communications between a source device and a dashboard sink device such that some of the functions are generic to which device is transmitting and which device is receiving. It should be noted, however, that one or more of the functions may be implemented from the perspective of only one of the source device and/or dashboard sink device individually as well as part of a system including both source and dashboard sink devices.

FIG. 17 is a flow chart illustrating an example method of a communication session between a wireless source device and an automobile dashboard sink device. The example method of FIG. 17 includes authenticating a wireless source device to communicate with a dashboard sink device (1700), communicating data indicative of the operational state of the automobile from the dashboard sink to the source device (1710), setting the operational state of the source device based on the operational state of the automobile (1720), communicating user input data from the dashboard sink to the source device (1730), and communicating automobile data from the dashboard sink to the source device (1740).

In one example, before mobile phone source 1600 communicates with dashboard sink 1610, phone source 1600 is authenticated for such a communication session. As explained above, communications between source and dashboard sink may vary widely depending on the manufacturer of the automobile and/or the dashboard in the automobile. Thus, different manufacturers may require different functionality of the same type of source device in order to communicate with the dashboard sink included in each respective manufacturer's automobiles.

Thus, rather than employing generic wireless display functions/applications, e.g. functions provided in one or more standards for WFD systems, in the context of a source communicating with an automobile dashboard sink, in one example, mobile phone source 1600 includes source dashboard application 1640 that is authenticated by the manufacturer of the automobile or dashboard sink 1610 (to the extent the two are manufactured by different companies) and specifically configured to communicate with dashboard sink 1610 of that manufacturer.

In such examples, authentication between dashboard/automobile manufacturers and third parties, e.g. mobile phone manufacturers and/or mobile phone application developers may be accomplished in a number of different ways. In the example illustrated in FIG. 16 in which mobile phone 1600 acts as a wireless source device and communicates with dashboard sink 1610, the dashboard/automobile manufacturer may authenticate source dashboard application 1640 of mobile phone source 1600. The authentication may include multiple levels of security for establishing communication between phone source 1600 and dashboard sink 1610.

In one example, the authentication of mobile phone source 1600 for communications with dashboard sink 1610 includes two levels of security. First, the application developer of source dashboard application 1640 may seek and the manufacturer may grant authorization of a particular application to coordinate and control communications between a source device executing the application and the dashboard sink device of the manufacturer. It is noted that the developer of source dashboard application 1640 may be the same company that manufactures mobile phone source 1600 or another company independent of the phone manufacturer. In any event, in one example, the developer of source dashboard application 1640 that develops applications executable on different operating systems of mobile phones, e.g. Google's Android, may seek authorization from a particular automobile manufacturer, e.g. BMW to develop an application for mobile phone source 1600 that will enable phone source 1600 to function as a wireless source device in communications with dashboard sink 1610 in a BMW automobile. In such an example, BMW may authenticate the mobile phone application by providing the application developer with a key or other authentication code or mechanism that may be communicated to dashboard sink 1610 in order to open communications between phone source 1600 and dashboard sink 1610.

Wireless communications may be unsecure and thus susceptible to various attacks from unauthorized users and/or devices. As such, in addition to providing an authentication key that is used to authenticate source dashboard application 1640 for use with mobile phone source 1600 in communications with dashboard sink 1610, examples according to this disclosure may also include securing the initial handshake between phone source 1600 and dashboard sink 1610 that includes the communication of the manufacturer authentication key. In one example, the initial handshake and communication of the authentication key between mobile phone source 1600 and dashboard sink 1610 is encrypted, e.g. using an encryption/decryption key scheme by which source dashboard application 1640 encrypts data including the manufacturer authentication key, wirelessly transmits the encrypted data to dashboard sink 1610, which, in turn, decrypts and reads the data from the phone. After phone source 1600 has been authenticated for communications with dashboard sink 1610, future communications may be transmitted without encryption.

In one example, the encrypted authentication session between mobile phone source 1600 and dashboard sink 1610 may be implemented using a public key and/or with an asymmetric encryption key method. In one example, the encrypted authentication session between phone source 1600 and dashboard sink 1610 may include symmetric-key authentication using a public key. Symmetric-key authentication may refer to an authentication system that uses trivially related, often identical, cryptographic keys for both encryption of plaintext and decryption of ciphertext. In this case, both the phone source 1600 and dashboard sink 1610 may use the same public key for encryption and decryption, which public key is provided by the manufacturer of dashboard sink 1610 and/or the automobile in which the dashboard is arranged. In another example, the encrypted authentication session between phone source 1600 and dashboard sink 1610 may include asymmetric-key authentication using a public key. Asymetric-key (sometimes referred to as public-key) authentication may refer to a system requiring two separate keys, one to lock or encrypt the plaintext, and one to unlock or decrypt the cyphertext. In this case, one of these keys for the authentication session between phone source 1600 and dashboard sink 1610 is published or public and the other is kept private.

In one example, dashboard sink 1610 may transmit a key as a challenge to phone source 1600, which may include some identification associated with the manufacturer of the dashboard and/or automobile. Mobile phone source 1600 may use a public key, and, in some cases, the authentication key, both of which may be provided by the manufacturer of dashboard sink 1610, to formulate a response to the challenge from and transmit the response back to dashboard sink 1610. Dashboard sink 1610 may then employ a private key to decrypt the response from phone source 1600 and authentication the source device, including, e.g. authenticating the device based on the authentication key.

In one example, after phone source 1600 has been authenticated for communications with dashboard sink 1610, the two devices may exchange a variety of different types of information for various purposes. For example, dashboard sink 1610 may transmit and mobile phone source 1600 may receive data indicative of the operational state of the automobile in which dashboard sink 1610 is arranged. In one example according to this disclosure, dashboard sink 1610 paired with mobile phone source 1600 may be configured to indicate to phone source 1600 when the state of the automobile in which dashboard sink 1610 is arranged changes and alter communications with and control operation of phone source 1600 based on the current state of the automobile. For example, dashboard sink 1610 may be configured to receive information from various components of the automobile, e.g., sensors and/or the ECU, which indicates whether the automobile is stopped or moving. In one example, dashboard sink 1610 determines that the automobile is moving and transmits a message to mobile phone source 1600 that indicates the operational state of the automobile, e.g. that it is moving. In another example, dashboard sink 1610 determines that the automobile is stopped and transmits a message to mobile phone source 1600 that indicates the operational state of the automobile, e.g. that it is stopped.

In one example, source dashboard application 1640 is configured to change various user interface functions of mobile phone source 1600 based on the operational state of the automobile. For example, source dashboard application 1640 can toggle between different user interfaces of mobile phone source 1600 including different sets of application icons, so that a user may have full access to all the phone applications, e.g., when the automobile is stopped, and a subset of less distracting applications, e.g., when the automobile is moving.

As indicated in the example method of FIG. 17, in addition to communicating data indicative of the operational state of the automobile in which dashboard sink 1610 is arranged, in some examples, the operational state of phone source 1600 may be set based the operational state of the automobile. For example, in the event dashboard sink 1610 determines that the automobile is moving, dashboard sink 1610 may send a command to mobile phone source 1600 that causes or configured to prompt phone source 1600 to cause itself to go into a limited functionality operation mode. For example, the command from dashboard sink 1610 may cause mobile phone source 1600 to limit access to certain functions that may be dangerous for users to execute while driving a car, e.g. text messaging.

In one example, dashboard sink 1610 may be configured to transmit user inputs received at dashboard sink 1610 back to mobile phone source 1600 and, thus, enable a user of dashboard sink 1610 to control phone source 1600 and interact with and control the content that is being transmitted from phone source 1600 to dashboard sink 1610. In such examples, applications and data available mobile phone source 1600 may be viewed, accessed, and interacted with on dashboard sink 1610 in the automobile in which the dashboard is arranged. In one example, mobile phone applications like contacts and calendar applications, navigation applications, digital music players, and the like may be easily and seamlessly presented on and interacted with via dashboard sink 1610.

Communicating user inputs from dashboard sink 1610 to mobile phone source 1600, e.g., via UIBC over communications channel 1630, may be implemented in a manner consistent with such communications more generally described above in detail with reference to FIGS. 1A-15B.

In addition to communicating the operational state of the automobile, the link between mobile phone source 1600 and dashboard sink 1610 facilitates a number of functions for communicating, analyzing, storing, manipulating, etc. data and/or devices related to or included in the automobile. Such data may be related to the operation of the automobile and devices may include peripheral devices in the automobile like speakers and microphones. In some examples, data from sensors and other devices on board the automobile in which dashboard sink 1610 is arranged may be communicated from dashboard sink 1610 to mobile phone source 1600.

For example, mobile phone source 1600 includes automobile agent 1660, e.g. stored on memory of and executed by a processor of dashboard sink 1610. Automobile agent 1660 may be configured to communicate with systems and devices of the automobile in which dashboard sink 1610 is arranged. For example, various devices of the automobile in which dashboard sink 1610 is arranged, e.g. an ECU and one or more sensors of the automobile may generate data related to the operation of the automobile. Automobile agent 1660 of dashboard sink 1610 may be configured to interface with and retrieve or receive such automobile data, which may then, in some examples, be transmitted to and processed in a variety of ways by mobile phone source 1600.

For example, gas mileage data tracked and stored by sensors and the ECU of the automobile in which dashboard sink 1610 is arranged may be retrieved by automobile agent 1660 executed on dashboard sink 1610. Additionally, other relevant operational data of the automobile like speed, acceleration, braking, and other data related to driving habits and metrics may be retrieved by automobile agent 1660 from one or more components of the automobile. This automobile data may be transmitted by dashboard sink 1610 to mobile phone source 1600, e.g., by a transport unit of sink 1610 encapsulating the automobile data and a Wi-Fi modem transmitting the data to phone source 1600. Mobile phone source 1600 may include various functions for processing the data including, e.g., an application that tracks and organizes gas mileage data over time, and, in some cases, correlates gas mileage to driving habits/metrics.

A wide variety of automobile data and processing of such data other than the foregoing gas mileage example is contemplated in examples according to this disclosure. For example, error codes from the automobile ECU may be tracked, stored, and communicated from dashboard sink 1610 to mobile phone source 1600, as well as other diagnostic information related to service, maintenance, and/or malfunctions of an automobile. Such error or diagnostic information from the automobile in which dashboard sink 1610 is arranged may be tracked and analyzed on mobile phone source 1600, which may, in turn, communicate the data to remote systems and devices via network 1670, including, e.g., transmitting error and/or diagnostic information over network 1670 to automatically request service appointments at a dealership or service station qualified and/or authorized to work on the automobile in which dashboard sink 1610 is arranged. Many other vehicle-specific types of data can be used in similar applications with other types of vehicles.

In some examples, automobile agent 1660 of dashboard sink 1610 may open a channel from mobile phone source 1600 to peripheral devices, e.g. speakers and/or a microphone in the automobile for direct interaction between mobile phone source 1600 and the peripherals. For example, the dashboard sink device may provide the wireless source device access to a higher quality microphone in the automobile than is included in mobile phone source 1600. In one example, a user of mobile phone source 1600 may wish to call someone in a contacts application on phone source 1600 while driving in the user's automobile and may use a voice command received at a microphone of the automobile which is interfaced to dashboard sink 1610 by automobile agent 1660 as a safer means of retrieving a contact number and initiating the call.

For simplicity of explanation, aspects of this disclosure have been described separately with reference to FIGS. 1A-17. It is contemplated, however, that these various aspects can be combined and used in conjunction with one another and not just separately. Generally, functionality and/or modules described herein may be implemented in either or both of the wireless source device and wireless sink device. In this way, communication and user interface capabilities described in the current example may be used interchangeably between the wireless source device and wireless sink device.

APPENDIX 1 provides additional details regarding some of the techniques described in this disclosure. Source device 120 and sink device 160 of FIGS. 1A and 1B, source device 220 of FIG. 2, sink device 360 of FIG. 1, source device 520 and sink device 560 of FIGS. 5A and 5B are all examples of devices and source/sink systems that can perform techniques described in APPENDIX 1.

Many details of this disclosure have been described in the context of an automobile. Several examples of automobile-specific data have been described in this context. As noted above, however, the techniques described herein may find a wide variety of application with numerous other types of vehicles, and the vehicle data may differ for such applications. Any vehicle that includes a display device on a dashboard or some equivalent structure can use one or more of the techniques described herein. The data communicated between the dashboard sink device and the source device may be vehicle-specific and may vary depending on the type of vehicle.

The techniques of this disclosure may be implemented in a wide variety of devices or apparatuses, including a wireless handset, and integrated circuit (IC) or a set of ICs (i.e., a chip set). Any components, modules or units have been described to illustrate functional aspects and do not necessarily require realization by different hardware units.

Accordingly, the techniques described herein may be implemented in hardware, software, firmware, or any combination thereof. If implemented in hardware, any features described as modules, units or components may be implemented together in an integrated logic device or separately as discrete but interoperable logic devices. If implemented in software, the techniques may be realized at least in part by a computer-readable medium comprising instructions that, when executed in a processor, performs one or more of the methods described above. The computer-readable medium may comprise a tangible and non-transitory computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various aspects of the disclosure have been described. These and other aspects are within the scope of the following claims.

The invention claimed is:

1. A method of transmitting user input data from a vehicle dashboard configured to a wireless source device, the method comprising:

obtaining user input data at a display device of a vehicle dashboard, wherein the vehicle dashboard is configured to function as a wireless sink device;

generating a data packet header, wherein the data packet header comprises a field to identify an input category of the user input data;

generating a data packet comprising the data packet header and payload data;

transmitting the data packet to the wireless source device;

receiving, by the vehicle dashboard, data packets comprising headers and payload data from the source device, wherein the payload data comprises encoded video data;

decoding, by a video decoder of the vehicle dashboard, the encoded video data; and rendering a graphical user interface of at least one application resident on the source device based on the decoded video data; and outputting, at the display device of the vehicle dashboard, the graphical user interface.

2. The method of claim 1, wherein the user input data comprises data indicating user interaction at the display device of the vehicle dashboard with the graphical user interface of the at least one application resident on the source device.

3. The method of claim 1, wherein the user input data comprises data indicating user interaction at the display device of the vehicle dashboard with one or more applications resident on the source device.

4. The method of claim 1, further comprising:

receiving, by the vehicle dashboard, data comprising an authentication key from the source device;

determining whether to open a communication session with the source device based on the authentication key; and transmitting a message to the source device indicating that the source device is authenticated for communications with the vehicle dashboard.

5. The method of claim 4, wherein receiving, by the vehicle dashboard, data comprising the authentication key comprises receiving, by the vehicle dashboard, encrypted data comprising the authentication key from the source device, and further comprising decrypting the data.

6. The method of claim 4, further comprising transmitting data comprising a challenge key to the wireless source device, and wherein the authentication key is associated with at least some of the data comprising the challenge key.

7. The method of claim 1, further comprising transmitting, by the vehicle dashboard, a message to the source device indicative of an operational state of a vehicle in which the vehicle dashboard is arranged so as to cause an operational state of the source device to be set based on the operational state of the vehicle.

8. The method of claim 7, wherein the message indicates that the vehicle is moving, and further comprising transmitting, by the vehicle dashboard, a command to the source device configured to cause the source device to limit access to one or more functions of the source device.

9. The method of claim 8, wherein the command is configured to cause the source device to limit access to one or more user functions comprising at least one of telephone calling, text messaging, and electronic mail functions.

10. The method of claim 1, further comprising:

obtaining, by the vehicle dashboard, data relating to the operation of a vehicle in which the vehicle dashboard is arranged; and transmitting the data relating to the operation of the vehicle to the source device.

11. The method of claim 10, wherein the data relating to the operation of the vehicle comprises at least one of vehicle speed, acceleration, braking, gas mileage, error codes, and diagnostic data.

12. The method of claim 1, wherein the vehicle comprises an automobile.

13. A vehicle dashboard configured to function as a wireless sink device and to transmit user input data to a wireless source device, the vehicle dashboard comprising:

memory storing instructions; a display device configured to obtain user input data;

one or more processors configured to execute the instructions, wherein upon execution of the instructions the one or more processors cause:

generating a data packet header, wherein the data packet header comprises a field to identify an input category of the user input data;

generating a data packet comprising the data packet header and payload data; and a transport unit to transmit the data packet to the wireless source device;

and further comprising a video decoder, and wherein the transport unit receives data packets comprising headers and payload data from the source device, wherein the payload data comprises encoded video data, the video decoder of the vehicle dashboard decodes the encoded video data, and upon execution of the instructions the one or more processors cause: rendering a graphical user interface of at least one application resident on the source device based on the decoded video data; and outputting, at the display device, the graphical user interface.

14. The vehicle dashboard of claim 13, wherein the user input data comprises data indicating user interaction at the display device of the vehicle dashboard with the graphical user interface of the at least one application resident on the source device.

15. The vehicle dashboard of claim 13, wherein the user input data comprises data indicating user interaction at the display device of the vehicle dashboard with one or more applications resident on the source device.

16. The vehicle dashboard of claim 13, further comprising:

the transport unit receiving data comprising an authentication key from the source device;

upon execution of the instructions the one or more processors cause determining whether to open a communication session with the source device based on the authentication key; and the transport unit transmitting a message to the source device indicating that the source device is authenticated for communications with the vehicle dashboard.

17. The vehicle dashboard of claim 16, further comprising the transport unit receiving encrypted data comprising an authentication key from the source device, and upon execution of the instructions the one or more processors cause decrypting the data.

18. The vehicle dashboard of claim 16, wherein the transport unit transmits data comprising a challenge key to the wireless source device, and wherein the authentication key is associated with at least some of the data comprising the challenge key.

19. The vehicle dashboard of claim 13, further comprising the transport unit transmitting a message to the source device indicative of an operational state of a vehicle in which the vehicle dashboard is arranged so as to cause an operational state of the source device to be set based on the operational state of the vehicle.

20. The vehicle dashboard of claim 19, wherein the message indicates that the vehicle is moving, and further comprising the transport unit transmitting a command to the source device configured to cause the source device to limit access to one or more functions of the source device.

21. The vehicle dashboard of claim 20, wherein the command is configured to cause the source device to limit access to one or more user functions comprising at least one of telephone calling, text messaging, and electronic mail functions.

22. The vehicle dashboard of claim 13, further comprising:
upon execution of the instructions the one or more processors cause obtaining data relating to the operation of a vehicle in which the vehicle dashboard is arranged; and
the transport unit transmitting the data relating to the operation of the vehicle to the source device.

23. The vehicle dashboard of claim 22, wherein the data relating to the operation of the vehicle comprises at least one of vehicle speed, acceleration, braking, gas mileage, error codes, and diagnostic data.

24. The vehicle dashboard of claim 13, wherein the vehicle comprises an automobile.

25. A non-transitory, computer-readable storage medium storing instructions that upon execution by one or more processors cause the one or more processors to perform a method of transmitting user input data from a vehicle dashboard configured to function as a wireless sink device to a wireless source device, the method comprising:
obtaining user input data at a display device of the vehicle dashboard;
generating a data packet header, wherein the data packet header comprises a field to identify an input category of the user input data;
generating a data packet comprising the data packet header and payload data;
transmitting the data packet to the wireless source device;
receiving, by the vehicle dashboard, data packets comprising headers and payload data from the source device, wherein the payload data comprises encoded video data;
decoding, by a video decoder of the vehicle dashboard, the encoded video data; and
rendering a graphical user interface of at least one application resident on the source device based on the decoded video data; and outputting, at the display device of the vehicle dashboard, the graphical user interface.

26. A vehicle dashboard configured to transmit user input data to a wireless source device, the vehicle dashboard comprising:
means for obtaining user input data at a display device of the vehicle dashboard, wherein the vehicle dashboard is configured to function as a wireless sink device;
means for generating a data packet header, wherein the data packet header comprises a field to identify an input category of the user input data;
means for generating a data packet comprising the data packet header and payload data;
means for transmitting the data packet to the wireless source device;
and further comprising means for decoding video, and wherein the means for transmitting the data packet to the wireless source device receives data packets comprising headers and payload data from the source device, wherein the payload data comprises encoded video data, the means for decoding video of the vehicle dashboard decodes the encoded video data, and upon execution of the instructions the one or more processors cause: rendering a graphical user interface of at least one application resident on the source device based on the decoded video data; and outputting, at the display device, the graphical user interface.

27. A method of receiving user input data, at a wireless source device, from a vehicle dashboard, the method comprising:
receiving a data packet from the vehicle dashboard, wherein the data packet comprises a data packet header and payload data, wherein the vehicle dashboard is configured to function as a wireless sink device at;
parsing the data packet header to determine an input category associated with user input data contained in the payload data;
processing the payload data based on the determined input category; and
further comprising capturing, by the source device, video data comprising a graphical user interface of at least one application resident on the source device; encoding, by a video encoder of the source device, the video data; transmitting data packets comprising headers and payload data to the vehicle dashboard, wherein the payload data comprises the encoded video data.

28. The method of claim 27, wherein the user input data comprises data indicating user interaction at a display device of the vehicle dashboard with the graphical user interface of the at least one application resident on the source device.

29. The method of claim 27, wherein the user input data comprises data indicating user interaction at a display device of the vehicle dashboard with one or more applications resident on the source device.

30. The method of claim 27, further comprising:
transmitting data comprising an authentication key from the source device to the vehicle dashboard, wherein the vehicle dashboard is configured to determine whether to open a communication session with the source device based on the authentication key; and
receiving, by the source device, a message from the vehicle dashboard indicating that the source device is authenticated for communications with the vehicle dashboard.

31. The method of claim 30, further comprising encrypting, by the source device, the data comprising the authentication key, wherein the vehicle dashboard is configured to decrypt the data.

32. The method of claim 30, further comprising receiving, by the source device, data comprising a challenge key from the vehicle dashboard, and wherein the authentication key is associated with at least some of the data comprising the challenge key.

33. The method of claim 27, further comprising:
receiving, by the source device, a message from the vehicle dashboard indicative of an operational state of a vehicle in which the vehicle dashboard is arranged; and
setting an operational state of the source device based on the operational state of the vehicle.

34. The method of claim 33, wherein the message indicates that the vehicle is moving, and further comprising limiting access to one or more functions of the source device while the vehicle is moving.

35. The method of claim 34, wherein limiting access to one or more functions of the source device comprises limiting access to one or more user functions comprising at least one of telephone calling, text messaging, and electronic mail functions.

36. The method of claim 27, further comprising:
receiving, by the source device, a message from the vehicle dashboard, wherein the message comprises data relating to the operation of the vehicle in which the vehicle dashboard is arranged; and
processing, by the source device, at least some of the data in the message transmitted by the vehicle dashboard.

37. The method of claim 36, wherein the data relating to the operation of the vehicle comprises at least one of vehicle speed, acceleration, braking, gas mileage, error codes, and diagnostic data.

38. The method of claim 37, wherein processing, by the source device, at least some of the data comprises correlating, by the source device, vehicle gas mileage data to at least one of vehicle speed, acceleration, and braking data.

39. The method of claim 37, wherein processing, by the source device, at least some of the data comprises automatically transmitting, by the source device, an electronic request for service to the vehicle in which the vehicle dashboard is arranged.

40. The method of claim 37, wherein processing, by the source device, at least some of the data comprises automatically generating, by the source device, an electronic reminder to have the vehicle in which the vehicle dashboard is arranged serviced.

41. The method of claim 27, wherein the vehicle comprises an automobile.

42. A wireless source device configured to receive user input data from a vehicle dashboard configured to function as a wireless sink device, the wireless source device comprising:
   a transport unit to receive a data packet from the vehicle dashboard, wherein the data packet comprises a data packet header and payload data;
   memory storing instructions; one or more processors configured to execute the instructions, wherein upon execution of the instructions the one or more processors cause:
   parsing the data packet header to determine an input category associated with user input data contained in the payload data;
   processing the payload data based on the determined input category; and
   further comprising a video encoder, and wherein upon execution of the instructions the one or more processors cause capturing video data comprising a graphical user interface of at least one application resident on the source device, the video encoder encodes the video data, and the transport unit transmits data packets comprising headers and payload data to the vehicle dashboard, wherein the payload data comprises the encoded video data.

43. The source device of claim 42, wherein the user input data comprises data indicating user interaction at a display device of the vehicle dashboard with the graphical user interface of the at least one application resident on the source device.

44. The source device of claim 42, wherein the user input data comprises data indicating user interaction at a display device of the vehicle dashboard with one or more applications resident on the source device.

45. The source device of claim 42, wherein the transport unit:
   transmits data comprising an authentication key from the source device to the vehicle dashboard, wherein the vehicle dashboard is configured to determine whether to open a communication session with the source device based on the authentication key; and
   receives a message from the vehicle dashboard indicating that the source device is authenticated for communications with the vehicle dashboard.

46. The source device of claim 45, further comprising upon execution of the instructions the one or more processors cause encrypting the data comprising the authentication key, wherein the vehicle dashboard is configured to decrypt the data.

47. The source device of claim 45, further comprising the transport unit receiving data comprising a challenge key from the vehicle dashboard, and wherein the authentication key is associated with at least some of the data comprising the challenge key.

48. The source device of claim 42, further comprising:
   the transport unit receiving a message from the vehicle dashboard indicative of an operational state of a vehicle in which the vehicle dashboard is arranged; and
   upon execution of the instructions the one or more processors cause setting an operational state of the source device based on the operational state of the vehicle.

49. The source device of claim 48, wherein the message indicates that the vehicle is moving, and further comprising upon execution of the instructions the one or more processors cause limiting access to one or more functions of the source device while the vehicle is moving.

50. The source device of claim 49, wherein upon execution of the instructions the one or more processors cause limiting access to one or more functions of the source device comprises limiting access to one or more user functions comprising at least one of telephone calling, text messaging, and electronic mail functions.

51. The source device of claim 42, further comprising:
   the transport unit receiving a message from the vehicle dashboard, wherein the message comprises data relating to the operation of the vehicle in which the vehicle dashboard is arranged; and
   upon execution of the instructions the one or more processors cause processing at least some of the data in the message transmitted by the vehicle dashboard.

52. The source device of claim 51, wherein the data relating to the operation of the vehicle comprises at least one of vehicle speed, acceleration, braking, gas mileage, error codes, and diagnostic data.

53. The source device of claim 52, wherein upon execution of the instructions the one or more processors cause processing at least some of the data comprises correlating, by the source device, vehicle gas mileage data to at least one of vehicle speed, acceleration, and braking data.

54. The source device of claim 52, wherein upon execution of the instructions the one or more processors cause processing at least some of the data comprises causing the transport unit to transmit an electronic request for service to the vehicle in which the vehicle dashboard is arranged.

55. The source device of claim 52, wherein upon execution of the instructions the one or more processors cause processing at least some of the data comprises automatically generating an electronic reminder to have the vehicle in which the vehicle dashboard is arranged serviced.

56. The source device of claim 42, wherein the vehicle comprises an automobile.

57. A non-transitory, computer-readable storage medium storing instructions that upon execution by one or more processors cause the one or more processors to perform a method of receiving user input data from a vehicle dashboard configured to function as a wireless sink device at a wireless source device, the method comprising:
   receiving a data packet from the vehicle dashboard, wherein the data packet comprises a data packet header and payload data;
   parsing the data packet header to determine an input category associated with user input data contained in the payload data;
   processing the payload data based on the determined input category; and further comprising a video encoder, and wherein upon execution of the instructions the one or more processors cause capturing video data comprising a graphical user interface of at least one application resident on the source device, the video encoder encodes the video data, and the transport unit transmits data packets comprising headers and payload data to the vehicle dashboard, wherein the payload data comprises the encoded video data.

58. A wireless source device configured to receive user input data from a vehicle dashboard configured to function as a wireless sink device, the wireless source device comprising:
   means for receiving a data packet from the vehicle dashboard, wherein the data packet comprises a data packet header and payload data;
   means for parsing the data packet header to determine an input category associated with user input data contained in the payload data;
   means for processing the payload data based on the determined input category; and
   further comprising means for encoding video, and wherein upon execution of the instructions the one or more processors cause capturing video data comprising a graphical user interface of at least one application resident on the source device, the means for encoding video encodes the video data, and the means for transporting the data packet transmits data packets comprising headers and payload data to the vehicle dashboard, wherein the payload data comprises the encoded video data.

59. A method of communicating between a vehicle dashboard configured to function as a wireless sink device and a wireless source device, the method comprising:
   authenticating the source device to communicate with the vehicle dashboard;
   communicating data indicative of the operational state of a vehicle in which the vehicle dashboard is arranged from the vehicle dashboard to the source device;
   setting the operational state of the source device based on the operational state of the vehicle;
   communicating at least one of user input data and vehicle data from the vehicle dashboard sink to the source device;
   receiving, by the vehicle dashboard, data packets comprising headers and payload data from the source device, wherein the payload data comprises encoded video data;
   decoding, by a video decoder of the vehicle dashboard, the encoded video data; and
   rendering a graphical user interface of at least one application resident on the source device based on the decoded video data; and outputting, at the display device of the vehicle dashboard, the graphical user interface.

* * * * *